US008753186B2

(12) United States Patent
Balise, III

(10) Patent No.: US 8,753,186 B2
(45) Date of Patent: Jun. 17, 2014

(54) SYSTEM AND METHOD OF PROVIDING A PLATFORM FOR PROVIDING SWEEPSTAKES AND SPONSORED PUZZLES FOR CROSSWORD PUZZLES AND OTHER WORD-BASED GAMES

(71) Applicant: James Balise, III, New York, NY (US)

(72) Inventor: James Balise, III, New York, NY (US)

(73) Assignee: PuzzleSocial LLC, New York, NY (US)

( * ) Notice: Subject to any disclaimer, the term of this patent is extended or adjusted under 35 U.S.C. 154(b) by 113 days.

(21) Appl. No.: 13/668,721

(22) Filed: Nov. 5, 2012

(65) Prior Publication Data

US 2014/0128137 A1 May 8, 2014

(51) Int. Cl.
*G06F 17/00* (2006.01)

(52) U.S. Cl.
USPC .......... 463/10

(58) Field of Classification Search
USPC .......... 463/10, 30, 35–40, 42
See application file for complete search history.

(56) References Cited

U.S. PATENT DOCUMENTS 4,179,126 A 12/1979 Coefield .......... 273/240
6,378,867 B1 4/2002 Shalless .......... 273/240
6,425,828 B2 7/2002 Walker et al. .......... 463/42
6,676,521 B1 1/2004 La Mura et al. .......... 463/42
7,744,456 B2 6/2010 Walther et al. .......... 463/17
2001/0032132 A1 10/2001 Moran .......... 705/14
2007/0117619 A1 5/2007 Walker et al. .......... 463/29
2007/0259709 A1 11/2007 Kelly et al. .......... 463/20
2009/0124311 A1 5/2009 Sandberg .......... 463/9
2010/0016083 A1 1/2010 Bruce .......... 463/42
2010/0041456 A1* 2/2010 Yu .......... 463/10
2012/0129607 A1* 5/2012 Jabara et al. .......... 463/41
2012/0178073 A1 7/2012 Wasmund .......... 434/362
2013/0040729 A1* 2/2013 Griffin .......... 463/25
2013/0079077 A1* 3/2013 Stegall .......... 463/9

* cited by examiner

*Primary Examiner* — Ronald Laneau
(74) *Attorney, Agent, or Firm* — Pillsbury Winthrop Shaw Pittman LLP

(57) ABSTRACT

The disclosure relates to systems and methods for providing an integrated online platform for gameplay of word-based games, obtaining and using virtual assets related to the word-based games such as crossword puzzle games and word search puzzle games, providing sponsored word-based games, and facilitating sweepstakes entries based on the word-based games. The systems and methods may provide an integrated online platform that facilitates the convergence of word-based games, sponsored brands, sweepstakes, prizes, and obtaining and using virtual assets related to the word-based games across social networks, mobile networks, and/or other networks. The integrated online platform leverages the use of various puzzles such as puzzles from third party puzzle providers, custom puzzles, and/or other puzzles for gameplay of the word-based games. The sponsored word-based games may provide opportunities for the user to win items such as branded items and the sponsor to engage an audience.

30 Claims, 11 Drawing Sheets

SYSTEM AND METHOD OF PROVIDING A PLATFORM FOR PROVIDING SWEEPSTAKES AND SPONSORED PUZZLES FOR CROSSWORD PUZZLES AND OTHER WORD-BASED GAMES

RELATED APPLICATIONS

This application is related to U.S. patent application Ser. No. 13/668,690 (now U.S. Pat. No. 8,702,486), filed on Nov. 5, 2012, entitled "SYSTEM AND METHOD FOR PROVIDING AN ONLINE PLATFORM FOR GAMEPLAY OF CROSSWORD PUZZLES AND OTHER WORD-BASED GAMES," which is incorporated by reference herein in its entirety.

FIELD OF THE INVENTION

The disclosure relates to systems and methods for providing an integrated online platform for gameplay of word-based games, obtaining and using virtual assets related to the word-based games, providing sponsored word-based games, and facilitating sweepstakes entries based on the word-based games.

BACKGROUND OF THE INVENTION

Casual games have become popular for various reasons. For example, casual games are typically inexpensive, can be played without detailed instructions, and are generally easily accessible in that they may be played via social networks, mobile application stores that provide mobile applications, and/or other platforms.

However, engaging the user (also referred to herein as player) of casual games is difficult. Oftentimes casual games are not social and the content is not current. For example, it is difficult to engage players of word-based games such as crossword puzzles, word search puzzles, and/or other word-based games.

These and other problems exist.

SUMMARY OF THE INVENTION

The disclosure relates to systems and methods for providing an integrated online platform for gameplay of word-based games, obtaining and using virtual assets related to the word-based games such as crossword puzzle games and word search puzzle games, providing sponsored word-based games, and facilitating sweepstakes entries based on the word-based games. The systems and methods may provide an integrated online platform that facilitates the convergence of word-based games, sponsored brands, sweepstakes, prizes, and obtaining and using virtual assets related to the word-based games across social networks, mobile networks, and/or other networks. The integrated online platform leverages the use of various puzzles such as puzzles from third party puzzle providers, custom puzzles, and/or other puzzles for gameplay of the word-based games. The sponsored word-based games may provide opportunities for the user to win branded and/or other items and the sponsor to engage an audience.

In some implementations, the system may include a game server. The game server may include one or more processors configured to perform some or all of a functionality of a plurality of modules, which may be stored in a memory. For example, the one or more processors may be configured to execute a gameplay module, a scoring and reward module, an online shop module, a custom puzzle module, an accounting module, an advertisement module, a profile module, a communication module, a user interface module 119 and/or other modules.

The game server may provide for and facilitate the use of various types of virtual assets. The virtual assets may be acquired in various ways such as earned based on gameplay, purchased using real currency, purchased using other virtual assets that act as virtual currency, and/or other ways to acquire the virtual assets.

In some embodiments, the gameplay module may be configured to communicate a word-based game based on a game definition that specifies the word-based game. In some embodiments, word-based games may be obtained from one or more third party providers. In these embodiments, content (such as a word-based game definition) for the word-based games may be obtained from the third party provider.

The gameplay, module may be configured to facilitate gameplay by generating a gameplay session based on various modes of operation of word-based games such as a single player word-based game mode, a head-to-head word-based game mode, a team word-based game mode, a tournament word-based game mode, and/or other modes of operation. During the single player word-based game mode, a single player may play the word-based game alone. In some embodiments, the gameplay module may be configured to present a time limit for the entire game and/or for a portion of the game such as one or more words (e.g., the player must enter one or more words in a crossword puzzle or find one or more words in a word search puzzle within a time limit). In these embodiments, the game may be terminated and/or the player may be penalized one or more virtual assets and/or actual currency. In some embodiments, the player may be given an unlimited amount of time to finish the game and/or a turn.

In some embodiments, the gameplay module may be configured to provide new instances of word-based games based on a regular interval that expires such that a new instance replaces a previous instance. For example, the gameplay module may be configured to provide a daily crossword puzzle that is made available at a particular time of the day (at which point a previous daily crossword puzzle may be replaced with a current daily crossword puzzle), a weekly crossword puzzle, a monthly crossword puzzle, and/or other word-based game in which a new instance of the word-based game replaces a previous instance of the word-based game at a regular interval. In some embodiments, an instance of a word-based game may be archived in a memory such as game database such that archived word-based games may be played at a later time.

In some embodiments, the gameplay module may be configured to provide word-based games based on a category. For example, the gameplay module may provide a celebrity crossword puzzle that includes words that are relevant to a celebrity, a news-based crossword puzzle based on current events in the news, and/or other category or theme word-based game.

In some embodiments, the gameplay module may be configured to provide category or theme word-based games at regular intervals. For example, the gameplay module may provide a daily celebrity crossword puzzle, a weekly celebrity crossword puzzle, and/or other category or theme word-based game in which a new instance of the word-based game replaces a previous instance of the word-based game at a regular interval.

In some embodiments, the gameplay module may be configured to provide one of more hints used to at least partially solve and/or provide clues to solve a word-based game. The hints may be provided during gameplay in one or more of the word-based game modes of operation. Different types of hints may be provided such as an ask-a-friend hint, an advertisement-based hint, a reveal correct hint, a reveal incorrect hint, and/or other type of hints.

In some embodiments, the scoring and reward module may be configured to score a game and provide the virtual assets based on gameplay. In some embodiments, the scoring and reward module may be configured to provide bonus awards based on gameplay. The bonus awards may include a number of virtual assets and/or types of in-game game bonus awards. The scoring and reward module may be configured to provide a daily bonus that includes one or more virtual assets. For example, a daily bonus may include a predefined number of daily energy and/or other types of virtual assets that are provided to the user for gameplay.

In some embodiments, the online shop module may be configured to provide an online shop that sells various items such as ad-free play, virtual assets, sweepstakes entries, and/or other items. The items may be purchased using virtual assets and/or actual currency. When purchases are made using virtual assets such as diamonds, the online shop module may cause the cost to be deducted from a player's account or profile that stores the number of virtual assets that the player has accrued. When purchases are made using real currency, online shop module may cause the cost to be deducted from stored account that includes a predefined credit of actual currency paid to the system for such purchases, cause a payment to be processed using various electronic payment methods, and/or use other payment methods.

In some embodiments, the custom puzzle module may be configured to facilitate custom word-based games such as custom crossword or word-search puzzles. The custom word-based games may be related to a sponsored word-based game, a sweepstakes word-based game, and/or other custom word-based games.

The sponsored word-based game may include brand integration such that information related to one or more products and/or services offered by a sponsor is displayed along with the sponsored word-based game. The sponsored word-based game may be played in one or more of the word-based game modes of operation described herein.

Brand integration may include placing marketing content such as text, images, and/or other marketing content relating to the products or services alongside the sponsored word-based game. In this example, custom puzzle module may store and obtain an association between the sponsored word-based game and the marketing content such that the marketing content may be displayed when presenting the sponsored word-based game for gameplay.

The sweepstakes word-based game may include a custom word-based game where the input of correct letters, words, and/or a completed game results in an award of one or more sweepstakes entries. Upon entry of a correct letter, word, and/or complete puzzle, custom puzzle module may cause one or more sweepstakes entries to be given to the player.

In some embodiments, brand integration and sweepstakes may be combined. For example, a custom word-based game may include branded content information alongside or integrated into a crossword puzzle where completion of at least a portion of the custom word-based game causes an entry into a sweepstakes that includes as a prize a product and/or service of a sponsor.

In some embodiments, the accounting module may be configured to monitor real and virtual currency transactions and events related to the word-based games in order to perform various accounting functions such as debit player accounts, charge sponsors for advertisement impressions, charge sponsors for sponsored content being showed/played, and/or other perform other accounting functions. The transactions may include virtual asset purchases, sweepstakes entry purchases, and/or other exchanges associated with the word-based game. The events may include activity related to advertisements, sponsored content, and/or other items in which a sponsor may pay to provide content via the system.

In some embodiments, the advertisement module may be configured to receive, cause to be stored, and retrieve advertisements. Advertisements may be in the form of video, audio, text, graphics, and/or other format.

In some embodiments, the profile module may be configured to register a user and maintain a user profile, which may be stored in a user profile database. The profile module may register the user based on information received from a social media provider and/or information from the user. The system may integrate with social media providers such that information associated with the user may be obtained via the social media site.

In some embodiments, the communication module may be configured to facilitate communications between the user and others. For example, the communication module may facilitate in-game communication with other users, invitations related to other users, integrate with social media, and/or perform other communication functions.

In some embodiments, the user interface module may be configured to provide one or more user interfaces for presenting the word-based games. The user interfaces may output information from the one or more modules disclosed herein and provide input during gameplay to the one or more modules.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
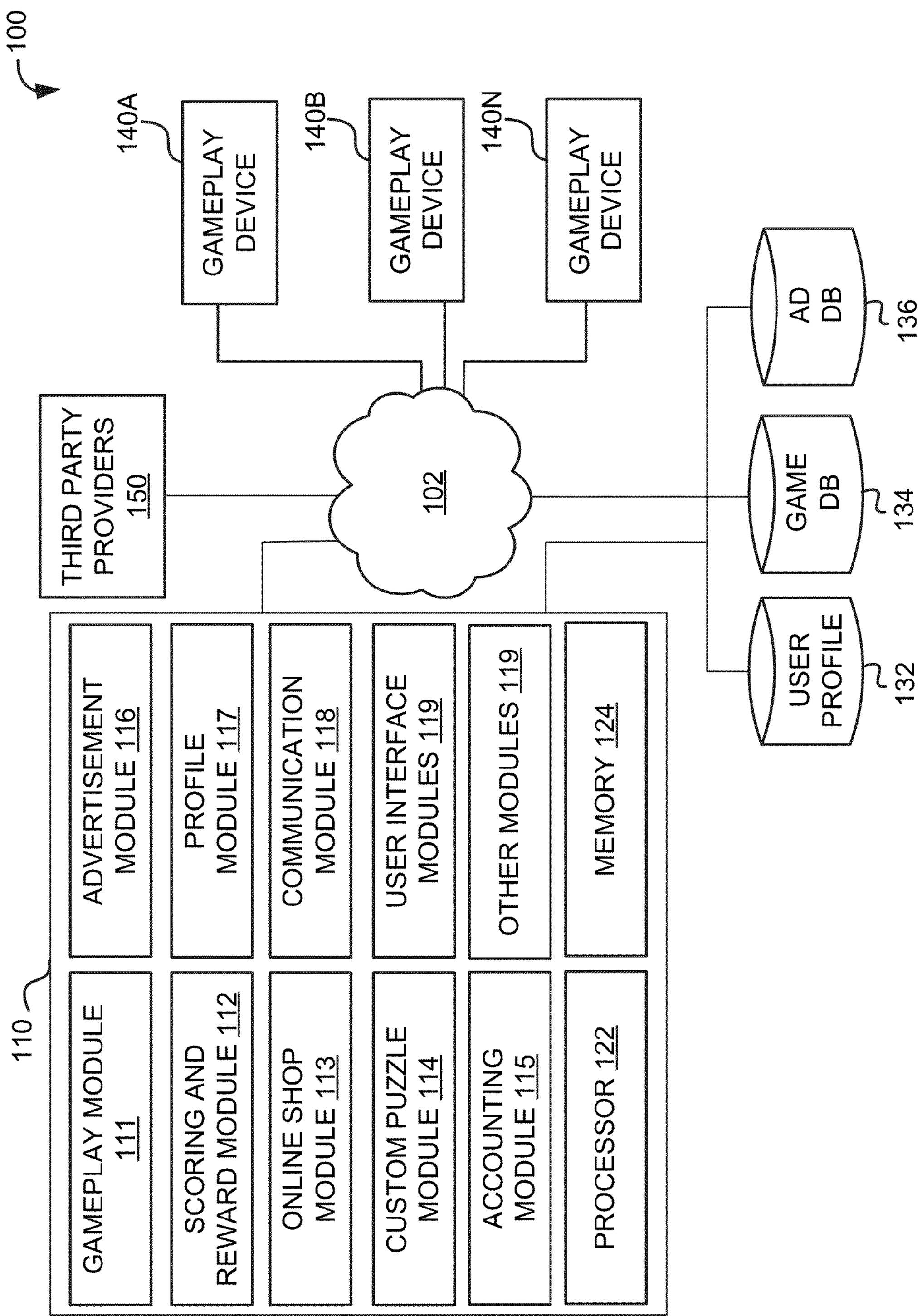
FIG. 1 illustrates a system of providing an online platform for gameplay of crossword puzzle games and other word-based games, according to an aspect of the invention.

FIG. 1 illustrates a system 100 of providing an online platform for gameplay of word-based games, according to an aspect of the invention. System 100 may include a game server 110, one or more gameplay devices 140 (illustrated in FIG. 1 as gameplay device 140A, 140B, and 140N), and/or other components. The word-based games may include crossword puzzle games, word search games, and/or other types of word-based games. Generally speaking, the word-based games may be communicated from game server 110 to gameplay devices 140 via a network 102 such as the Internet and played in an online fashion.

In some embodiments, the word-based game may be communicated from game server 110 to gameplay devices 140 as one or more instructions that are executed at gameplay devices 140 to allow the word-based game to be played. The word-based games may be played within or in association with various social media networking such as FACEBOOK and/or be played as a standalone application such as a mobile or other application.

In some implementations, game server 110 may include one or more processors 122 configured to perform some or all of a functionality of a plurality of modules, which may be stored in a memory 124. For example, the one or more processors may be configured to execute a gameplay module 111, a scoring and reward module 112, an online shop module 113, a custom puzzle module 114, an accounting module 115, an advertisement module 116, a profile module 117, a communication module 118, a user interface module 119 and/or other modules 120.

Game server 110 may provide for and facilitate the use of various types of virtual assets. The virtual assets may be acquired in various ways such as earned based on gameplay, purchased using real currency, purchased using other virtual assets that act as virtual currency, and/or other ways to acquire the virtual assets.

In some embodiments, particular types of virtual assets must be purchased (with real and/or virtual currency), while others must be earned based on gameplay, while still others may be earned and/or purchased (with real and/or virtual currency). In some embodiments, particular types of virtual assets may be used to purchase only certain other virtual assets, certain real items, and/or other items.

The virtual assets may be used by the user to acquire various benefits related to the game such as, for example, play a game, hints to solve the game, ad-free play, other virtual assets, real items, real sweepstakes entries, and/or other benefits.

Virtual assets may include energy, diamonds, tokens, and/or other virtual assets. In some embodiments, energy may be used to play word-based games. For example, the cost to play a crossword puzzle may include one or more units of energy. Different types of energy may be accrued such as, for example, a daily energy, an extra energy, and/or other types of energy. In some embodiments, certain types of energy must be used before other types of energy may be used. For example, units of daily energy must be used until exhausted (e.g., zero units of daily energy remaining) or fall below a threshold amount before extra energy may be used.

Diamonds may be used to purchase ad-free games, extra energy, boosts (or hints to solve a letter, word, and/or entire puzzle), one or more sweepstakes entries to sweepstakes, and/or other items. For example, a number of diamonds may be exchanged for a sweepstakes entry. In some embodiments, diamonds may be earned by based on gameplay such as by solving letters, words, and/or whole puzzles. In some embodiments, diamonds may not be purchased using real currency.

Tokens may be used to receive one or more hints for a solution to the word-based game, save a game, print a game, and/or receive other game-related benefits. A predefined number of tokens may be used to receive a hint. The hint may include revealing one or more correct letters and/or words. The hint may cause random or player-selected letters and/or words of the game to be revealed. Randomly selected letters may be part of a single word and/or multiple words. A player-selected reveal may cost more tokens than a randomly selected reveal. In some embodiments, the hint may include revealing one or more incorrect letters and/or words. A different number of tokens may be charged for revealing incorrect letters and/or words than for revealing correct letters and/or words.

A predefined number of tokens may be used to save a game. For example, a player may save a game to resume playing at a later time by exchanging a number of tokens for the ability to save a particular crossword puzzle or other word-based game being played. A predefined number of tokens may be used to print a game. For example, a player may print a game to obtain a hard copy of a crossword puzzle by exchanging a number of tokens for the ability to print the crossword puzzle or other word-based game being played.

In some embodiments, tokens must be purchased with real currency and may not be earned. In some embodiments, a starting number of tokens may be initially provided to a user after which tokens must be purchased with real currency and may not be earned.

In some embodiments, gameplay module 111 may be configured to present a word-based game based on a game definition that specifies the word-based game. The game definition may be formatted as extensible markup language ("XML"), JavaScript Object Notation ("JSON"), spreadsheet format, and/or other format that can specify the word-based game. Whichever format is used, the game definition may include words of the word-based game, a level of difficulty of the word-based game, and/or other information. For example, for each of the answers of a crossword puzzle, the game definition may specify a word, an orientation of the word (e.g., across or down), a location of the word on the puzzle, a number related to the word, a clue for the word, and/or other information associated with the word. For each word to be found in a word search puzzle, the game definition may specify the word, an orientation of the word (e.g., across, down, angled, backward, forward, etc.), a location of the word on the puzzle, and/or information associated with the word. In some embodiments, the game definition may include filler letters that fill remaining spaces of the word search puzzle or the filler letters may be randomly generated when the game is instantiated or otherwise rendered.

In some embodiments, word-based games may be obtained from one or more third party providers 150. In these embodiments, content (such as a word-based game definition) for the word-based games may be obtained from the third party provider.

In some embodiments, the game definition may be hard-coded as part of gameplay module 111. In some embodiments, the game definition may be stored in a memory such as word-based game database 134. The game definition may be associated with an identifier that identifies the game definition. The identifier may include or be associated with a name of a word-based game, a topic or type of the word-based game (e.g., a daily game, a celebrity daily game, etc.). Gameplay module 111 may be configured to obtain a game definition and render the word-based game based on the game definition. In some embodiments, new word-based games may be added by adding a new game definition to word-based game database 134 or other memory.

Gameplay module 111 may be configured to facilitate gameplay by generating a gameplay session based on various modes of operation of word-based games such as a single player word-based game mode, a head-to-head word-based game mode, a team word-based game mode, a tournament word-based game mode, and/or other modes of operation. During the single player word-based game mode, a single player may play the word-based game alone. In some embodiments, gameplay module 111 may be configured to present a time limit for the entire game and/or for a portion of the game such as one or more words (e.g., the player must enter one or more words in a crossword puzzle or find one or more words in a word search puzzle within a time limit). In these embodiments, the game may be terminated and/or the player may be penalized one or more virtual, assets and/or actual currency. In some embodiments, the player may be given an unlimited amount of time to finish the game and/or a turn.

In some embodiments, gameplay module 111 may be configured to facilitate a head-to-head word-based game mode in which a first player may play against a second player. Gameplay module 111 may be configured to allow the first player to invite the second player to play a head-to-head game and/or be invited to play against the second player. Gameplay module 111 may determine a winner based on who finishes the game first (e.g., correctly inputs all words of a crossword puzzle, correctly identifies all words of a word search puzzle, etc.), acquires the most points as discussed further herein, and/or other metric to determine a winner.

In some embodiments, gameplay module 111 may be configured to facilitate a team word-based game mode in which more than one player may team up to collectively play together. In some embodiments, the team play may be similar to the single player word-based game mode in that the team may be playing to simply finish the word-based game. In some embodiments, the team play may be similar to the head-to-head word-based game mode in that the team may play against another player and/or team of players. In some embodiments, the gameplay module 111 may be configured to facilitate head-to-head and/or team word-based game modes using group play in which three or more sets of individual players and/or teams may play against one another.

In some embodiments, gameplay module 111 may be configured to facilitate a tournament word-based game mode in which a tournament may be held. Gameplay module 111 may be configured to implement the tournament in various ways. For example, gameplay module 111 may generate bracket-style tournament in which a single player and/or team faces off against another player and/or team. In some embodiments, gameplay module 111 may generate a playoff-style tournament in which a predefined top number of individual players and/or team of players advance through successive rounds until a tournament winner is determined.

In embodiments where a first player and/or team plays against a second player and/or team, gameplay module 111 may be configured to facilitate gameplay in a race mode, a turn-based asynchronous mode, and/or other mode. In the race mode, competing players and/or teams may race to complete the word-based puzzle game before other competing players and/or teams. In the turn-based asynchronous mode, competing players and/or teams may be given turns to complete one or more words during their respective turns. Each turn may be limited by time (e.g., be given a predefined and configurable time limit in which to complete the turn) and/or limited by number of letters/words attempted.

In some embodiments, gameplay module 111 may be configured to provide new instances of word-based games based on a regular interval that expires such that a new instance replaces a previous instance. For example, gameplay module 111 may be configured to provide a daily crossword puzzle that is made available at a particular time of the day (at which point a previous daily crossword puzzle may be replaced with a current daily crossword puzzle), a weekly crossword puzzle, a monthly crossword puzzle, and/or other word-based game in which a new instance of the word-based game replaces a previous instance of the word-based game at a regular interval. In some embodiments, an instance of a word-based game may be archived in a memory such as game database 134 such that archived word-based games may be played at a later time.

In some embodiments, gameplay module 111 may be configured to provide word-based games based on a category. For example, gameplay module 111 may provide a celebrity crossword puzzle that includes words that are relevant to a celebrity, a news-based crossword puzzle based on current events in the news, and/or other category or theme word-based game.

In some embodiments, gameplay module 111 may be configured to provide category or theme word-based games at regular intervals. For example, gameplay module 111 may provide a daily celebrity crossword puzzle, a weekly celebrity crossword puzzle, and/or other category or theme word-based game in which a new instance of the word-based game replaces a previous instance of the word-based game at a regular interval.

The word-based games that are newly provided at regular intervals (whether category-based or not) may be provided in one or more of the various gameplay modes such as the single player word-based game mode, a head-to-head word-based game mode, a team word-based game mode, a tournament word-based game mode, and/or other modes of operation.

In some embodiments, gameplay module 111 may be configured to maintain a score such as a number of points for the game. The gameplay module may use the score to determine a winner in a head-to-head game in which one or more first players are competing against one or more second players, a tournament game, and/or other game in which one or more players compete against one or more other players. For example, a winner may be determined based on which player(s) have the highest score at the end of a time limit, when all of the words have been entered/found, and/or at other times.

Gameplay module 111 may use the score to determine player skill levels, and/or other player tracking for games in which one or more players are not competing against other players. In some embodiments, a number of points may be assigned for a correct letter and/or word (e.g., such as when a correct letter and/or word is entered into a crossword puzzle or found in a word search game).

In some embodiments, gameplay module 111 may be configured to provide one of more hints used to at least partially solve and/or provide clues to solve a word-based game. The hints may be provided during gameplay in one or more of the word-based game modes of operation. Different types of hints may be provided such as an ask-a-friend hint, an advertisement-based hint, a reveal correct hint, a reveal incorrect hint, and/or other type of hints.

The ask-a-friend hint may include allowing the player to ask one or more friends such as social media contacts, users, and/or others to help insert or reveal one or more letters/words. In some embodiments, the ask-a-friend hint may be implemented as a chat or other communication directed to the friend via the communication module. In these implementations, at least a portion of the word-based game (such as a clue, image of the puzzle game, etc.) may be communicated to the friend.

In some embodiments, the friend may use the system to interactively view the particular instance of the word-based game being played. For example, gameplay module may send an invitation to the friend to help the player, which may include a link or other reference to the current instance of the word-based game being played. The friend may use the link or other reference to view the current instance of the word-based game being played and provide their input via chat, email, etc., and/or directly via the word-based game as if the friend were playing. The player may accept or reject at least a portion of the friend's input.

The advertisement-based hint may reveal a number of letters/words in the word-based game in exchange for the player watching an advertisement. In some embodiments different levels of hint quality such as number of revealed letters/words may be based on the type of advertisement viewed. For example, advertisements that are longer in duration or higher-valued (e.g., when the sponsor pays a premium) may result in higher quality hints.

The reveal correct hint may reveal a number of correct letters/words in exchange for a number of tokens. In some embodiments, the reveal correct hint may include a fixed cost such as 25 tokens for the hint. In some embodiments different levels of hint quality such as number of revealed letters/words may be based on the number of tokens received from the player to obtain the hint. For example, a greater number of received tokens may result in higher quality hints.

The reveal incorrect hint may reveal a number of letters/words that were incorrectly entered in exchange for a number of tokens. In some embodiments, the reveal incorrect hint may include a fixed cost such as 100 tokens for the hint. In some embodiments different levels of hint quality such as number of revealed incorrect letters/words may be based on the number of tokens received from the player to obtain the hint. For example, a greater number of received tokens may result in higher quality hints.

In some embodiments, gameplay module 111 may individually limit the number of times that the hints may be used. For example, gameplay module 111 may individually limit the number of times that the ask-a-friend hint, the advertisement-based hint, the reveal correct hint, the reveal incorrect hint, and/or other hint may be used, where each type of hint may have its own limit different from or the same as the limit for another type of hint. In some embodiments, gameplay module 111 may collectively limit the number of times that any of the hints may be used. For example, gameplay module 111 may limit the number of times that any one the ask-a-friend hint, the advertisement-based hint, the reveal correct hint, the reveal incorrect hint, and/or other hint may be used, where the use of any type of hint reduces a number of times that another type of hint may be used.

In some embodiments, gameplay module 111 may be configured to assign a player skill level for a player based on gameplay of the word-based game. Player skill levels may be represented in various ways such as numerically. For example, a particular numeric level may indicate a greater level of skill and/or experience than another numeric level. Other representations and interpretations of player skill level may be used as well.

Gameplay module 111 may advance the player skill level associated based on gameplay, In some embodiments, gameplay module 111 may be configured to advance the player skill level during one or more of the gameplay modes such as the single player word-based game mode, the head-to-head word-based game mode, the team play word-based game mode, the tournament word-based game mode, and/or other modes. In some embodiments, gameplay module 111 may be configured to advance the player skill level based on only particular types of gameplay modes.

For example, gameplay module 111 may be configured to track a number of wins in head-to-head competition by the player and use the number or wins to determine whether the player should be associated with a more advanced player skill level. In some embodiments, a player may be required to win a predefined and configurable number of head-to-head games before the player skill level is advanced. In a particular non-limiting example, a player may be required to win five head-to-head games before the player skill level is advanced.

In some embodiments, gameplay module 111 may be configured to advance the player to a first player skill level based on a first requirement that is different from a second requirement used to advance the player to a second player skill level. For example, as a player's skill level advances, it may be increasingly difficult to achieve a higher level. For relatively lower player skill levels, gameplay module 111 may advance a player to the next player skill level based on number of wins without respect to a number of losses.

On the other hand, for relatively higher player skill levels, gameplay module 111 may advance a player to the next player skill level while taking into account the number of losses. For example, each time that a player that is associated with a relatively high player skill level loses a head-to-head game, the number of wins is decremented. In some embodiments, when a player advances to a relatively higher player skill level, gameplay module 111 may track a number of wins of the player for the higher skill level such that losses that result in a number of wins below a threshold number of wins (e.g., zero) for the higher skill level causes the player level to be decremented to a lower skill level.

In some embodiments, gameplay module 111 may be configured to advance the player to different levels based on a difficulty rating of games/puzzles completed. For example, a first crossword puzzle may be less difficult to complete/solve than a second crossword puzzle. As such, the first crossword puzzle may be associated with a first difficulty rating that is different from a second difficulty rating associated with the second crossword puzzle.

In some embodiments, scoring and reward module 112 may be configured to provide the virtual assets. Scoring and reward module 112 may provide a predefined number of units of daily energy each day to a player in a use or lose manner. For example, the player may be awarded a number of units of daily energy such that the player must use the provided daily energy within a 24-hour period after the daily energy is provided or lose the free daily energy (which may reset the following 24-hour period). In other words, a player may not save daily energy for later use. The daily energy may be provided for free (no real or virtual currency required).

In some embodiments, when the daily energy has been exhausted or otherwise is no longer sufficient to pay the energy required to play a word-based game, extra energy may be used. Scoring and reward module 112 may provide for free a predefined number of units extra energy. Extra energy may be purchased using real currency via the online shop discussed herein in relation to online shop module 113. Extra energy may be persistent in that the player may save unused units of extra energy (whether acquired for free or purchased) from one day to the next.

In some embodiments, scoring and reward module 112 may be configured to provide diamonds based on gameplay such as by solving letters, words, and/or whole puzzles. In some embodiments, diamonds may not be purchased using real currency.

In some embodiments, scoring and reward module 112 may be configured to provide a starting number of tokens after which additional tokens must be purchased with real currency and may not be earned.

In some embodiments, scoring and reward module 112 may be configured to provide bonus awards based on gameplay. The bonus awards may include a number of virtual assets and/or types of in-game game bonus awards. For example, a bonus award may include a number of units of energy, a number of diamonds, and/or other virtual assets. Different types of bonus awards may be award such as, for example, a daily bonus award, a retention bonus, performance-based bonus awards, and/or other types of bonus awards. In some embodiments, the number of virtual assets that are awarded by bonus awards may be capped by a maximum number. For example, a player may not receive more than 25 diamonds in one or more bonus awards in a day, a week, or other time period.

Scoring and reward module 112 may be configured to provide a daily bonus that includes one or more virtual assets. For example, a daily bonus may include a predefined number of daily energy and/or other types of virtual assets that are provided to the user for gameplay.

The daily bonus may include a retention bonus such that progressively increasing numbers and/or types of bonuses are awarded based on consecutive daily visits by the player. Scoring and reward module 112 may obtain a number of consecutive days in which the player has logged on to the system or otherwise played an online word-based game provided by the system in order to determine the retention bonus. For example, based on the number of consecutive days, scoring and reward module 112 may award a predefined number of units of energy and/or a predefined number of diamonds.

In a particular non-limiting example, scoring and reward module 112 may award a first number (e.g., two) of units of energy for a first consecutive visit, a second number (e.g., three) of units of energy for a second consecutive visit (e.g., a visit in which the player has logged on or played a word-based game for a second straight day), a third number (e.g., four) of units of energy and a number of diamonds (e.g., one) for a third consecutive visit, a fourth number (e.g., five) of units of energy and another number of diamonds (e.g., five) for a fourth consecutive visit, and so on. Other numbers and combinations of virtual assets may be used in the retention bonus as well.

In some embodiments, scoring and reward module 112 may be configured to provide performance-based bonus awards that include one or more virtual assets (and/or one or more types of virtual assets) based on performance related to gameplay. For example, performance-based bonus awards may include a number of puzzles played bonus, a time bonus, a perfect bonus, a streak bonus, and/or other performance-based bonus.

The number of puzzles played bonus may include a bonus award based on a number of puzzles that are played in a day (e.g., a 24-hour period) and/or other time period. Scoring and reward module 112 may progressively increase the number and/or type of virtual assets awarded as the number of word-based games that are played in the day or other time period increases.

The time bonus may include a bonus award based on an amount of time used by the player to complete a word-based game. Scoring and reward module 112 may progressively increase the number and/or type of virtual assets awarded as the amount of time used by the player decreases.

The perfect bonus may include a bonus award based on a perfect word-based game played (e.g., no errant letter and/or word input). The perfect streak bonus may include a bonus award based on a number of consecutive perfect games played. Scoring and reward module 112 may progressively increase the number and/or type of virtual assets awarded as the number of consecutive perfect games played increases.

In some embodiments, the bonus award may be collected only after an advertisement is displayed at the completion of the word-based game during ad-supported gameplay.

In some embodiments, online shop module 113 may be configured to provide an online shop that sells various items such as ad-free play, virtual assets, sweepstakes entries, and/or other items. The items may be purchased using virtual assets and/or actual currency. When purchases are made using virtual assets such as diamonds, online shop module 113 may cause the cost to be deducted from a player's account or profile that stores the number of virtual assets that the player has accrued. When purchases are made using real currency, online shop module 113 may cause the cost to be deducted from stored account that includes a predefined credit of actual currency paid to the system for such purchases, cause a payment to be processed using various electronic payment methods, and/or use other payment methods.

Online shop module 113 may be configured to sell energy and tokens in exchange for real currency. For example, the online shop module may sell extra energy and/or tokens for an amount of real currency.

Online shop module 113 may be configured to exchange diamonds for sweepstakes entries. For example, online shop module 113 may deduct a number of diamonds from a player's account in exchange for one or more entries in a sweepstakes for one or more real and/or virtual prizes. For example, a player profile/identifier may be associated with one or more sweepstakes entry identifiers that are entered into a sweepstakes drawing.

Online shop module 113 may be configured to sell ad-free play that allows for gameplay without advertisements being displayed during gameplay. Ad-free play may be sold in exchange for virtual assets and/or actual currency. In some embodiments, ad-free play may expire after a predefined increment of time. In these embodiments, ad-free play may be sold in different increments of time such as, for example, 30 days, 90 days, one year, and/or other time period. The cost to purchase the different increments of time may increase as the increment increases and/or require different forms of payment. For example, a 30 day increment of time of ad-free play may cost a number of diamonds, a 90 day increment of time of ad-free play may cost an amount of real currency, while a one year increment of time may cost another (higher) amount of real currency. In some embodiments, certain increments of time may cost a combination of diamonds and real currency.

In some embodiments, custom puzzle module 114 may be configured to facilitate custom word-based games such as custom crossword or word-search puzzles. The custom word-based games may be related to a sponsored word-based game, a sweepstakes word-based game, and/or other custom word-based games.

The sponsored word-based game may include brand integration such that information related to one or more products and/or services offered by a sponsor is displayed along with the sponsored word-based game. The sponsored word-based game may be played in one or more of the word-based game modes of operation described herein.

Brand integration may include placing marketing content such as text, images, and/or other marketing content relating to the products or services alongside the sponsored word-based game. In this example, custom puzzle module 114 may store and obtain an association between the sponsored word-based game and the marketing content such that the marketing content may be displayed when presenting the sponsored word-based game for gameplay.

Brand integration may include including text such as words related to the products and/or services into the sponsored word-based game itself. For example, a name of a product and/or service may be included as a crossword puzzle answer, for which a hint related to the product and/or service may be given. The name of the product and/or service may be included as a word to be found in a sponsored word search game.

The sweepstakes word-based game may include a custom word-based game where the input of correct letters, words, and/or a completed game results in an award of one or more sweepstakes entries. Upon entry of a correct letter, word, and/or complete puzzle, custom puzzle module 114 may cause one or more sweepstakes entries to be given to the player.

In some embodiments, brand integration and sweepstakes may be combined. For example, a custom word-based game may include branded content information alongside or integrated into a crossword puzzle where completion of at least a portion of the custom word-based game causes an entry into a sweepstakes that includes as a prize a product and/or service of a sponsor.

In some embodiments, accounting module 115 may be configured to monitor real and virtual currency transactions and events related to the word-based games in order to perform various accounting functions such as debit player accounts, charge sponsors for advertisement impressions, charge sponsors for sponsored content being showed/played, and/or other perform other accounting functions. The transactions may include virtual asset purchases, sweepstakes entry purchases, and/or other exchanges associated with the word-based game. The events may include activity related to advertisements, sponsored content, and/or other items in which a sponsor may pay to provide content via the system.

In some embodiments, accounting module 115 may be configured to present tiered pricing where different advertisement and/or sponsorship receivables vary based on a number of advertisement impressions, advertisement clicks, number of sponsored games being played, number of sponsored games being completed, etc.

In some embodiments, advertisement module 116 may be configured to receive, cause to be stored, and retrieve advertisements. Advertisements may be in the form of video, audio, text, graphics, and/or other format. Advertisement module 116 may receive advertisements from advertisers wishing to promote their goods and/or services via the system. Advertisement module 116 may store the received advertisements in a memory such as advertisement database 136. Advertisement module 116 may select advertisements to be displayed at appropriate times based on a round-robin, random, and/or other selection method.

In some embodiments, profile module 117 may be configured to register a user and maintain a user profile, which may be stored in a user profile database 132. Profile module 117 may register the user based on information received from a social media provider and/or information from the user. The system may integrate with social media providers such that information associated with the user may be obtained via the social media site. For example, a user may register with the system via the social media site, which causes information to be provided to profile module 117.

The user profile may include user preferences, gameplay information, contacts, social media information, and/or other information related to the user. User preferences may include, for example, various formatting preferences such as, for example, font size, game canvas size, and/or other preferences of the user. Gameplay information may include, for example, whether the user has purchased ad-free games, the number and types of virtual assets purchased or earned by the user, achievements, saved games, games played, and/or other gameplay information. Achievements may include high scores, fastest times, streaks, player skill level, and/or other information. Contacts may include other users of the system and/or social media contacts. Contacts may identify who may be used to play with, play against, receive hints from, communicate with, and/or otherwise interact with. Social media information may include links to or information from one or more social media sites.

In some embodiments, communication module 118 may be configured to facilitate communications between the user and others. For example, communication module 118 may facilitate in-game communication with other users, invitations related to other users, integrate with social media, and/or perform other communication functions. In-game communication with other users may include in-game chat, email, SMS text, and/or other communications with users during gameplay. Invitations related to other users may include receiving and/or sending invitations to play with other users, play against other users, be a contact, and/or other invitations. Integration with social media may include sending communications such as invitations, high scores, best times, and/or other information to social media sites for posting on or otherwise communicating via the social media sites.

In some embodiments, user interface module 119 may be configured to provide one or more user interfaces for presenting the word-based games. The user interfaces may output information from the one or more modules disclosed herein and provide input during gameplay to the one or more modules.

One or more of the foregoing modules may be communicated as gameplay instructions from game server 110 to gameplay devices 140 and/or be executed at game server 110 during gameplay. For example, the gameplay instructions may be configured as FLASH instructions, SILVERLIGHT instructions, HTML5 instructions, and/or other instructions that when executed at the gameplay device configures the gameplay device to perform the functions of the gameplay instructions. In some embodiments, the gameplay instructions may be communicated to gameplay devices 140 via a social media provider such as FACEBOOK when the word-based game is embedded within or included with a webpage communicated by the social media provider.

In some embodiments, gameplay may be online such as when game server 110 hosts the online game. In some embodiments, gameplay device 140 may render the word-based game as a standalone application.

In some embodiments, the gameplay instructions may be stored on one or more tangible computer readable storage media such as, for example, read only memory, random access memory, magnetic disk storage media, optical storage media, flash memory devices, and/or other storage media at server device 110. A machine-readable transmission media may include forms of propagated signals, such as carrier waves, infrared signals, digital signals, and others.

In some embodiments, gameplay information such as purchases, game status, game input, and/or other information may be communicated to game server 110, which may use the gameplay information for processing as described herein. In some embodiments, the gameplay information may be at least partially processed at gameplay device 140 and/or the social media provider based on the gameplay instructions.

Embodiments where more than one player is playing a single game (e.g., head-to-head, team, tournament, etc), more than one player may be using the same gameplay device 140 or different gameplay devices 140.

One or more applications, including various modules, may be loaded into memory and run on an operating system of game server 110 and/or gameplay device 140. In one implementation, game server 110 and gameplay device 140 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
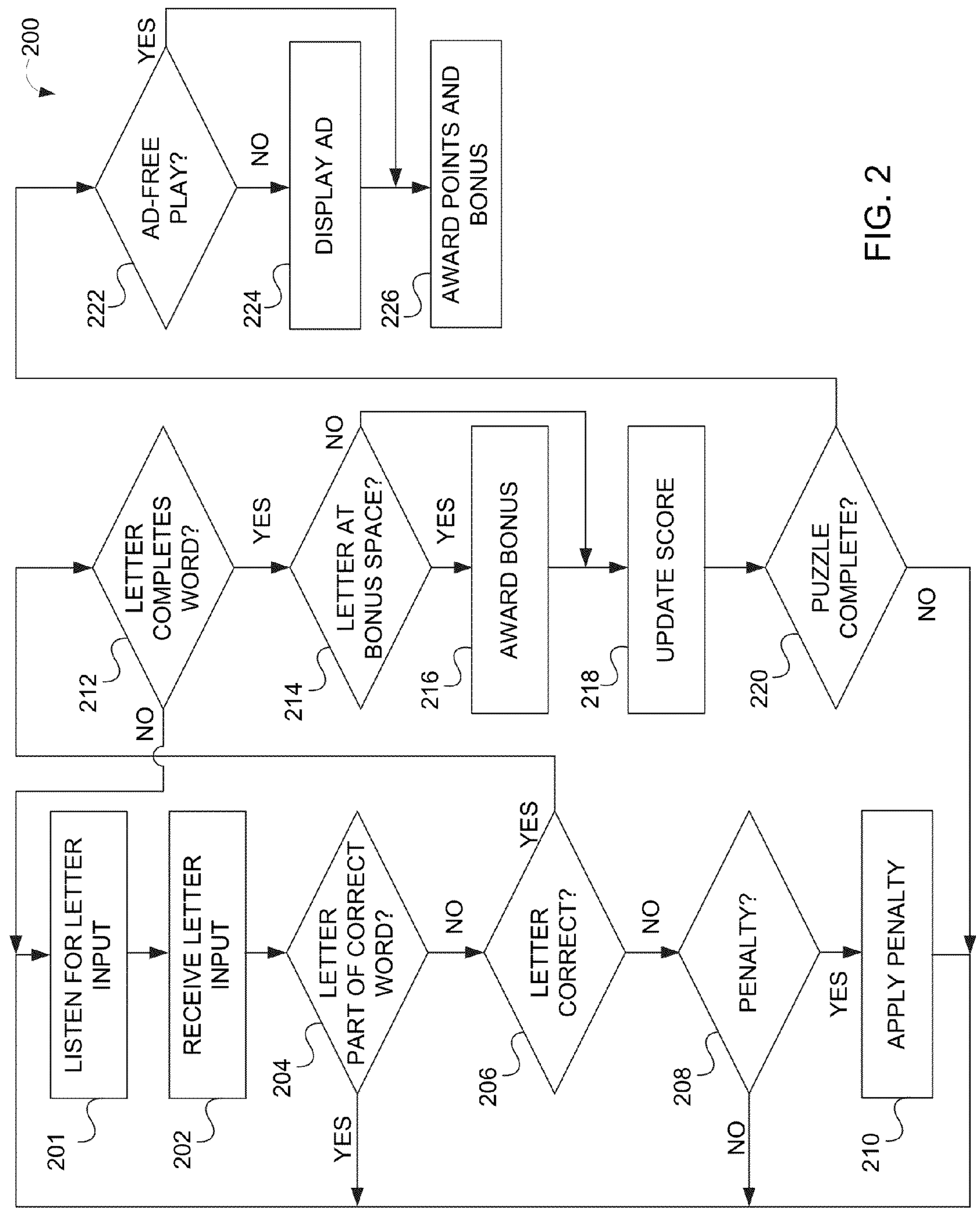
FIG. 2 illustrates a process of providing gameplay of crossword games and other word-based games, according to an aspect of the invention.

FIG. 2 illustrates a process of providing gameplay of crossword games and other word-based games, according to an aspect of the invention. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 201, processing may listen for a letter input. In an operation 202, a letter input may be received in relation to a space on a crossword puzzle. For example, a player may input a letter into an online crossword puzzle space. In an operation 204, a determination of whether the space for which the letter input was received is part of a correctly entered word may be made. If the space is part of a correctly entered word, processing may return to an operation 201, where a letter input is awaited. For example, if the player attempts to add a letter to an already correctly solved word, the letter input may be ignored. On the other hand, if the space is not part of a correctly entered word, in an operation 206, a determination of whether the letter is correct may be made. For example, a solution to the puzzle having an association of correct letters and spaces may be consulted to determine whether the letter input at the space matches the correct letter for the space.

If the letter is not correct, in an operation 208, a determination of whether a penalty for an incorrect letter should be assessed may be made. For example, in some embodiments, one or more rules for the crossword puzzle may specify that a player should be penalized for an incorrectly entered letter. If a penalty should be assessed, in an operation 210, a penalty may be applied to the player. A penalty may include, for example, frozen gameplay for a predefined time while continuing to deduct time from a time limit, deduction of time from the time limit, deduction of a quantity of one or more virtual assets, and/or other penalties. Upon application of the penalty, or if there is no penalty for an incorrect letter, processing may return to operation 201, where a letter input is awaited.

Returning to operation 206, if the input letter in relation to the space is correct, a determination of whether the letter completes a correct word (e.g., is the last letter of a correct word) is made. If the letter does not complete a correct word (e.g., is correct but is not the last letter of the correct word), processing may return to operation 201, where a letter input is awaited. If the letter does complete a correct word, in an operation 214, a determination of whether a bonus should be received may be determined. For example, a bonus may be received when one or more of the spaces related to the correct word are associated with a bonus. The bonus may be represented, for example, as a diamond or other virtual asset that is displayed within or associated with a space.

If a special bonus should be awarded, in an operation 216, a bonus may be awarded to a player (e.g., credited into an account of the player). Processing may proceed to an operation 218, where a score for the player may be updated based on the completed word. For example, a number (e.g., one) of points may be awarded for each letter of the word that was correctly input to the player's overall score.

In an operation 220, a determination of whether the crossword puzzle is complete may be made. If the crossword puzzle is not complete, processing may return to an operation 201, where a letter input may be awaited. If the crossword puzzle is complete, a determination of whether ad-free play is enabled in an operation 222. For example, the player may have paid for or otherwise is eligible for ad-free play. If ad-free play is not enabled, an advertisement may be displayed in an operation 222. In some embodiments, whether the advertisement is configured as a video, audio, text, and/or other format, the advertisement may be displayed for a predetermined time. After the predetermined time or if ad-free play is enabled, processing may proceed to an operation 226, where a total score for the player and bonus awards may be determined and awarded to the player. The total score may be based on individual scores awarded for each correct word, a time required to complete the crossword puzzle (e.g., less time results in more points), a time remaining on a time limit (e.g., more time remaining results in more points), a number of penalties given during gameplay, and/or other factors.

Figure 3:
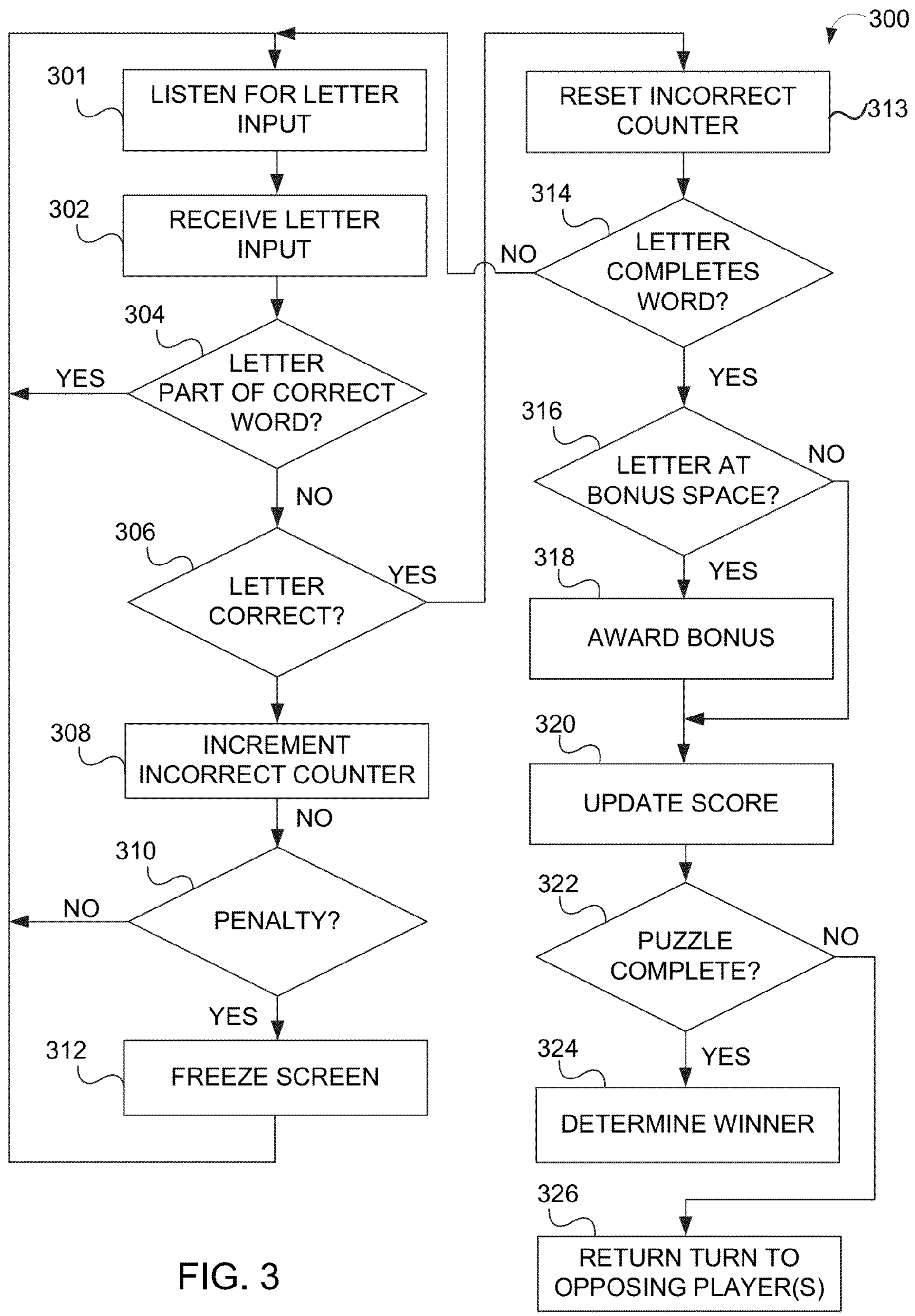
FIG. 3 illustrates a process of providing gameplay of crossword games and other word-based games, according to an aspect of the invention.

FIG. 3 illustrates a process of providing gameplay of crossword games and other word-based games, according to an aspect of the invention. In an operation 301, processing may listen for a letter input. In an operation 302, a letter input may be received in relation to a space on a crossword puzzle. For example, a player may input a letter into an online crossword puzzle space. In an operation 304, a determination of whether the space for which the letter input was received is part of a correctly entered word may be made. If the space is part of a correctly entered word, processing may return to an operation 301, where a letter input is awaited. For example, if the player attempts to add a letter to an already correctly solved word, the letter input may be ignored. On the other hand, if the space is not part of a correctly entered word, in an operation 306, a determination of whether the letter is correct may be made. For example, a solution to the puzzle having an association of correct letters and spaces may be consulted to determine whether the letter input at the space matches the correct letter for the space.

If the letter is not correct, in an operation 308, a consecutive incorrect letter counter is incremented. In an operation 310, a determination of whether the consecutive incorrect letter counter meets or exceeds a predefined and configurable threshold is made. For example, the threshold may be set at three such that three consecutively incorrect letters meets or exceeds the threshold. In the threshold has been met or exceeded, in an operation 312, gameplay may be frozen while a timer is continued as a penalty. Alternatively or additionally, other penalties may be applied. When gameplay is frozen or if the threshold has not been met, processing may return to an operation 301, where a letter input is awaited.

Returning to operation 306, if the input letter in relation to the space is correct, the consecutive incorrect letter counter may be reset to zero in an operation 313. In an operation 314, a determination of whether the letter completes a correct word (e.g., is the last letter of a correct word) is made. If the letter does not complete a correct word (e.g., is correct but is not the last letter of the correct word), processing may return to operation 301, where a letter input is awaited. If the letter does complete a correct word, in an operation 316, a determination of whether a bonus should be received may be determined. For example, a bonus may be received when one or more of the spaces related to the correct word are associated with a bonus. The bonus may be represented, for example, as a diamond or other virtual asset that is displayed within or associated with a space.

If a bonus should be awarded, in an operation 318, a bonus may be awarded to a player (e.g., credited into an account of the player). Processing may proceed to an operation 320, where a score for the player may be updated based on the completed word. In an operation 322, a determination of whether the crossword puzzle is complete is made. If the crossword puzzle is complete, in an operation 324, a winner may be determined based on total scores achieved during gameplay. If the crossword puzzle is not yet complete, a control may be transferred to an opposing player or team in an operation 326. Although described as a turn-based process, various operations of process 300 may be used in a race style of gameplay.

Although the foregoing processes 200 and 300 have been described in terms of processing after each letter input is received, similar processes may perform processing after each word input is received such as when a player presses a "submit" or similar input after a word has been entered. Also, processes 200 and 300 may be used for more than one player (e.g., team play). In embodiments where processes 200 and/or 300 are subject to time limits (either based on a game time limit that limits a total time to finish a game or turn time limit that limits an amount time that may be used in a turn before a player's turn is over) and/or where time is otherwise a factor in scoring, when the time limit expires, processes 200 and/or 300 may be interrupted or terminated based on time expiring.

Figure 4:
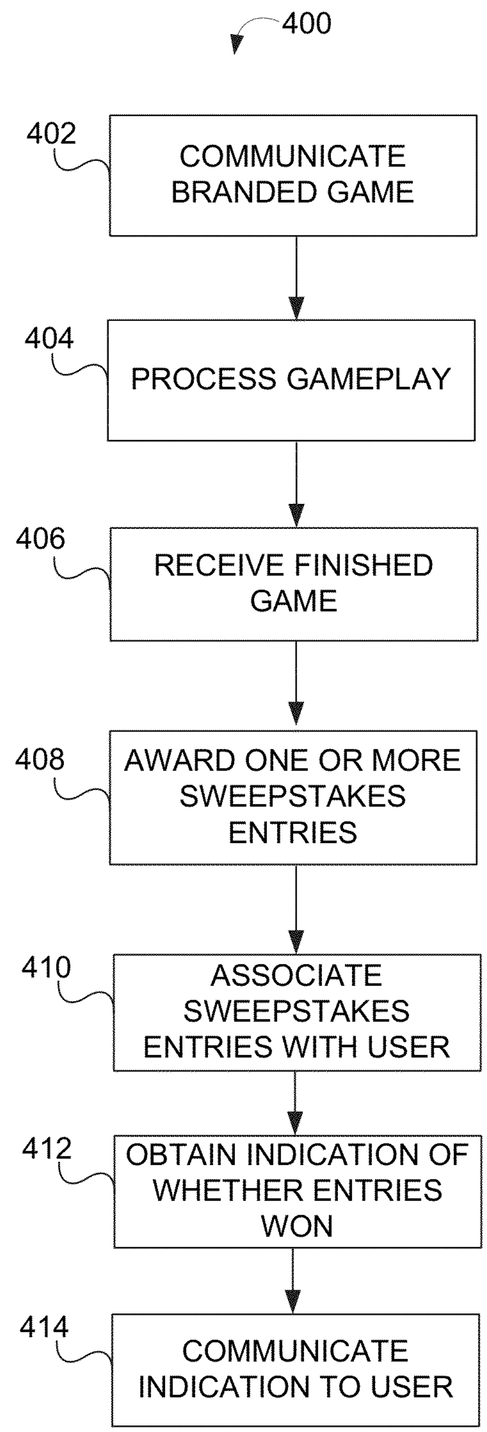
FIG. 4 illustrates a process of providing a branded sweepstakes crossword game and other word-based games, according to an aspect of the invention.

FIG. 4 illustrates a process 400 of providing a sponsored word-based game, according to an aspect of the invention. In an operation 402, a sponsored word-based game may be presented for gameplay. Various architectures for presenting the sponsored word-based game may be used. For example, a server may host an online gaming session with a client, a computing device may be configured with a standalone application that presents the branded, word-based game in a local gameplay session, and/or other architectures may be used to present the sponsored word-based game may be used. The sponsored word-based game may be played in one or more of the word-based gameplay modes of operation described herein.

In an operation 404, the sponsored word-based game may be processed for gameplay. For example, operation 404 may include one or more operations described with respect to process 200 and/or 300. In an operation 406, a completed or at least partially completed sponsored word-based game may be received. For example, one or more players and/or teams may have at least partially solved the sponsored word-based game.

In an operation 408, one or more sweepstakes entries may be generated for the one or more players and/or teams based on the at least partially completed sponsored word-based game. A number of the sweepstakes entries that is awarded may be based on various sweepstake entry award factors such as, for example, a time left remaining on a game clock that counts down from a time limit, a score, an amount of time used to at least partially complete the word-based game, whether one or more bonuses were received (e.g., whether letters were placed on tiles associated with diamonds and/or other virtual assets), and/or other factors. For example, better gameplay performance may result in an award of more sweepstakes entries.

In an operation 410, the one or more sweepstakes entries may be awarded to the one or more players and/or teams. For example, an account associated with the one or more players and/or teams may be associated with the one or more sweepstakes entries.

In an operation 412, an indication of whether the one or more sweepstakes entries won the sweepstakes may be obtained. In an operation 414, the indication may be communicated to the one or more players and/or teams.

Figure 5:
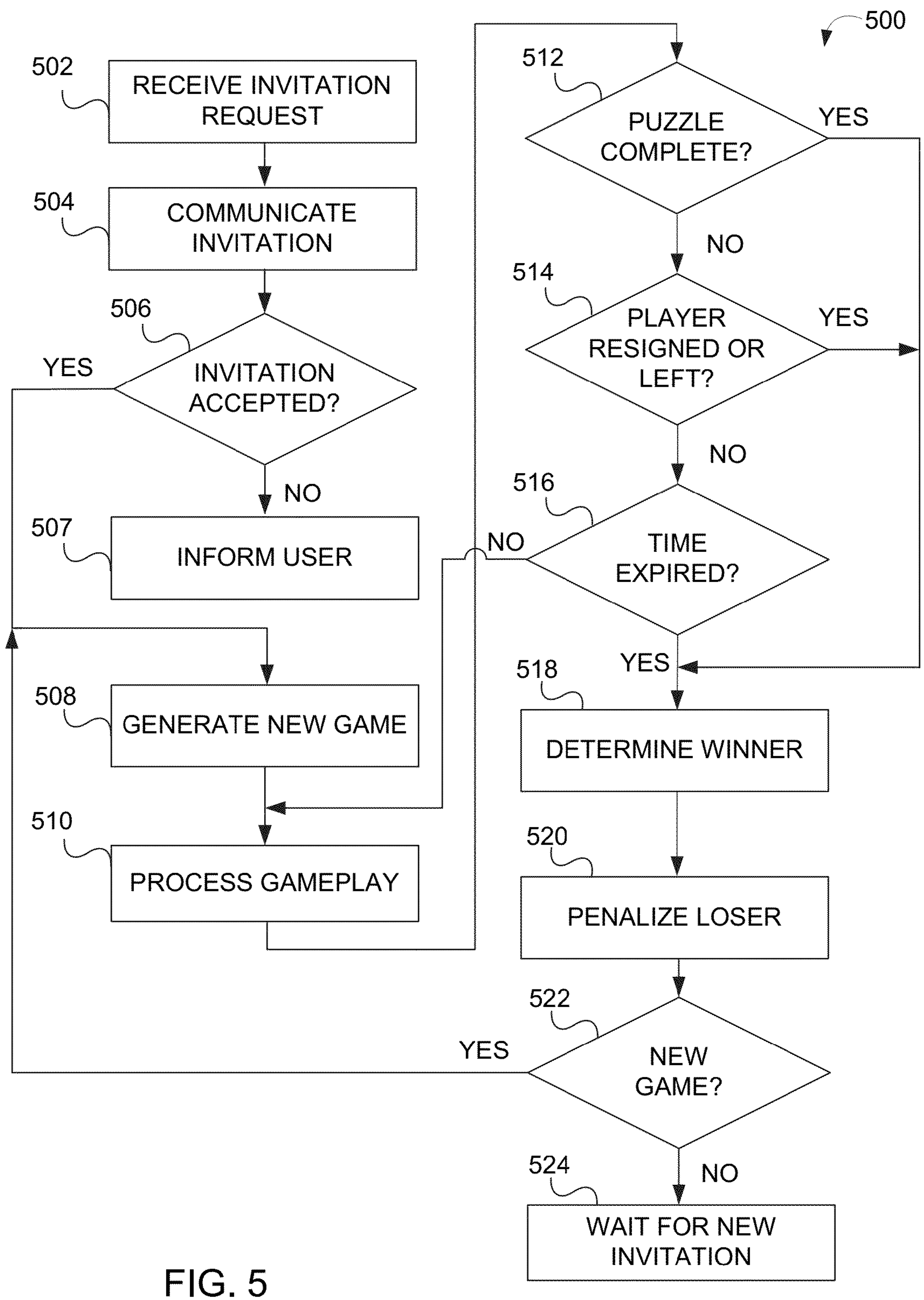
FIG. 5 illustrates a process of providing gameplay of crossword games and other word-based games, according to an aspect of the invention.

FIG. 5 illustrates a process 500 of facilitating invitations to play word-based games, according to an aspect of the invention. In an operation 502, an invitation request may be received from one or more first players. In some embodiments, the invitation request may include various invitation parameters that specify aspects of the word-based game to be played. For example, the invitation parameters may include a difficulty level parameter that specifies a level of difficult of the word-based game to be played, a game time limit parameter that specifies whether and/or how long a time limit should be used that limits a game, a turn time limit parameter that specifies whether and/or how long a time limit should be used that limits a turn (if turn-based is used), a turn-type parameter that specifies whether turn-based play should be used, and/or other invitation parameters.

In some embodiments, the invitation request may be directed to particular one or more players. In other embodiments, the invitation request may be directed to any one or more players and/or may include a request for the system to find appropriate one or more players. For example, the system may find an appropriate player based on characteristics common to the one more first players and prospective players such as, for example, player skill levels, interests, etc. In some embodiments, the system may find an appropriate player based on social media contacts who are currently online or playing a game.

In an operation 504, an invitation may be communicated to one or more second players that were identified in the request and/or identified by the system. In an operation 504, a determination of whether the challenge was accepted may be made. If the invitation is not accepted, the one or more first players may be notified of the declination in an operation 507. On the other hand, if the challenge is accepted, a new word-based game session may be generated in an operation 508.

In an operation 510, the word-based game session may be processed such as by performing one or more operations of process 200, process 300, and/or other process. In an operation 512, a determination of whether the word-based game has been completed may be made. If the word-based game has not been completed, a determination of whether a player has resigned or otherwise left the word-based game session may be made in an operation 514. If the player has not resigned or left, a determination of whether game time limit has been reached may be made in an operation 516. If the game time limit has not been reached, processing may return to operation 510, where the word-based game session is processed.

If the word-based game is complete, a player has resigned or left, or if the game time limit has been reached, a winner may be determined in an operation 518. In an operation 520, in some embodiments, a penalty such as a decrease in skill level may be imposed upon the losing one or more players. In an operation 522, a determination of whether a new game is desired may be determined. For example, the one or more first players and/or the one or more second players may be asked whether a new game is desired. If a new game is desired, processing may return to operation 508, where a new game session may be generated. If a new game is not desired, processing may terminate or wait for a new invitation request in an operation 524.

Referring to FIGS. 6-11, the screenshots of interfaces 600-1100 are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting. The various interfaces may be generated and/or communicated from one or more components of system 100 such as user interface module 119.

In some embodiments, the various interfaces 600-1100 may share in common at least some components (whether illustrated explicitly or not). When component numbers are explicitly displayed in different figures, the description of those component numbers are applicable to the different figures.

In some embodiments, a navigation component 601 may be configured to provide navigation between different interfaces and/or functions. Navigation component 601 may link to different interfaces 600-1100, profile information, communication functions, different word-based games, and/or other interfaces or functions.

Display portions 602, 604, 606, 608, 610 and/or other display portions may display various information related to gameplay. For example, display portion 602 may display remaining energy of the player, display portion 604 may display a number of diamonds the player possesses, display portion 606 may display different word-based games that may be played, display portion 608 may display a player skill level, display portion 610 may display a number of tokens that the player possesses, and/or other display portions may display other information related to gameplay. In some embodiments, display portions 602, 604, 606, 608, 610 and/or other display portions include a link to functions related to the display portions such as, for example, links to purchase or obtain virtual assets, play different word-based games, and/or other related functions.

Figure 6:
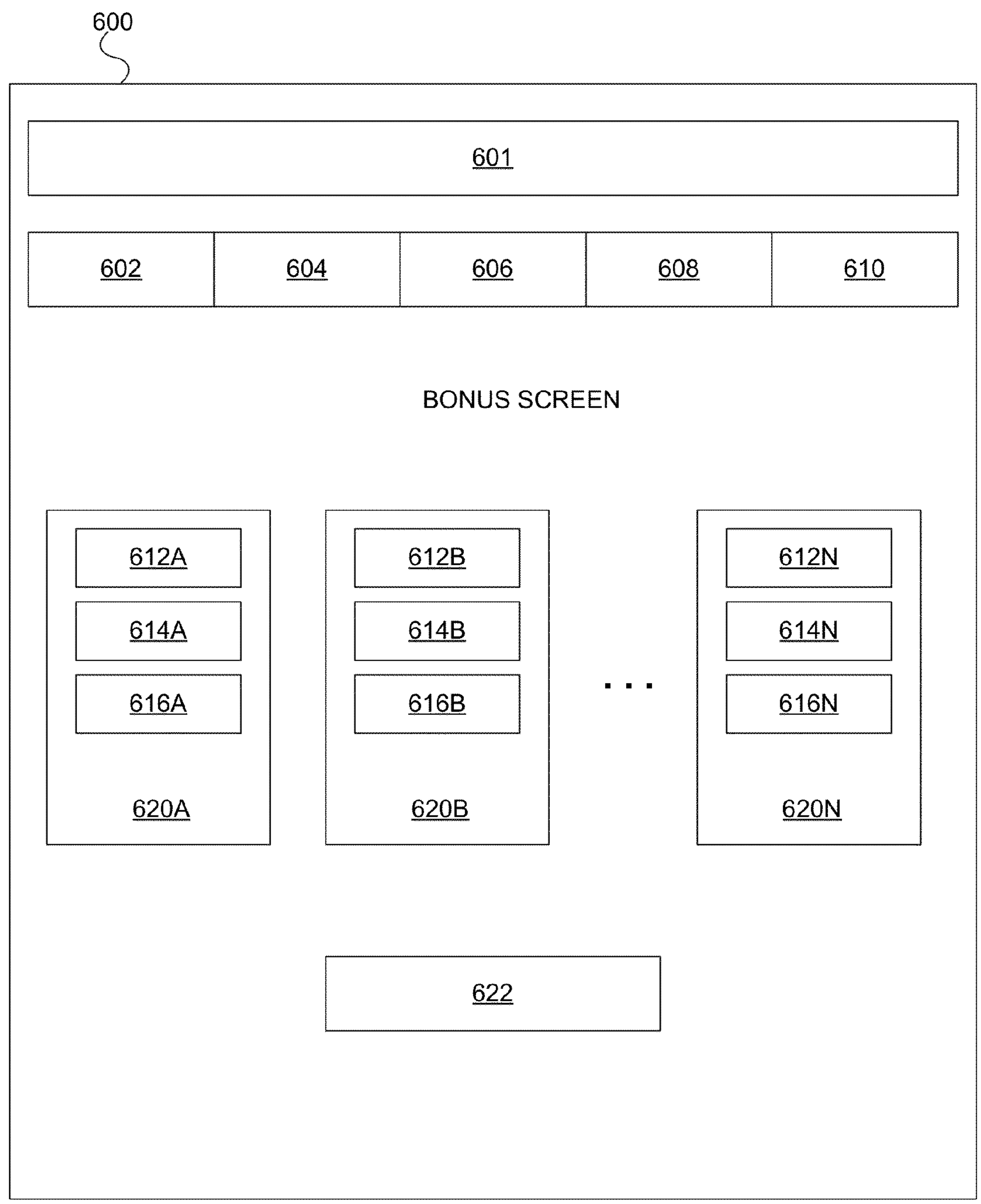
FIG. 6 illustrates a screenshot of a bonus screen interface, according to an aspect of the invention.

FIG. 6 illustrates a screenshot of a bonus screen interface 600, according to an aspect of the invention. In some embodiments, bonus screen interface 600 may be displayed when a player logs onto the system. Bonus screen interface 600 may display a progressive bonus that progressively increases a number of bonus items that are awarded based on a number of consecutive visits 620 (illustrated as consecutive visits 620A, 620B, . . . , 620N) to the system. Consecutive visits 620 may be measured by a time increment such as a number of days that the player has consecutively performed an action. The action may include, for example, logged onto the system, played a game, completed a game, completed a word, made a purchase, viewed an advertisement, and/or other action by the player. As the number of consecutive days that the player has logged onto the system increases, for example, the progressive bonus may increase.

Consecutive visits 620 may be associated with one or more corresponding bonus items 612, 614, 616. Bonus items 612, 614, 616 may include different types of bonus items such that the progressive bonus can include a combination of different types of bonus items. In this manner, the number of types of bonus items that are awarded in relation to consecutive visits 620 may be increased. Different quantities of individual bonus items 612, 614, 616 may be associated with consecutive visits 620. In this manner, the quantity of individual bonus items 612, 614, 616 that are awarded in relation to consecutive visits may be increased.

In a non-limiting example, a player that has logged onto the system on a first day may be awarded a progressive bonus that includes a bonus item such as two bonus daily energy. If the player logs onto the system on a second consecutive day, the progressive bonus may include three daily energies. If the player logs onto the system on a third consecutive day, the progressive bonus may include four daily energies and one diamond. If the player logs onto the system on a fourth consecutive day, the progressive bonus may include five daily energy and five diamonds. If the player logs onto the system on a fifth consecutive day, the progressive bonus may include five daily energies and 25 diamonds. The progressive bonus may be subsequently increased (in terms of number of different bonus items and/or quantities of individual bonus items) as consecutive logons increase.

Figure 7:
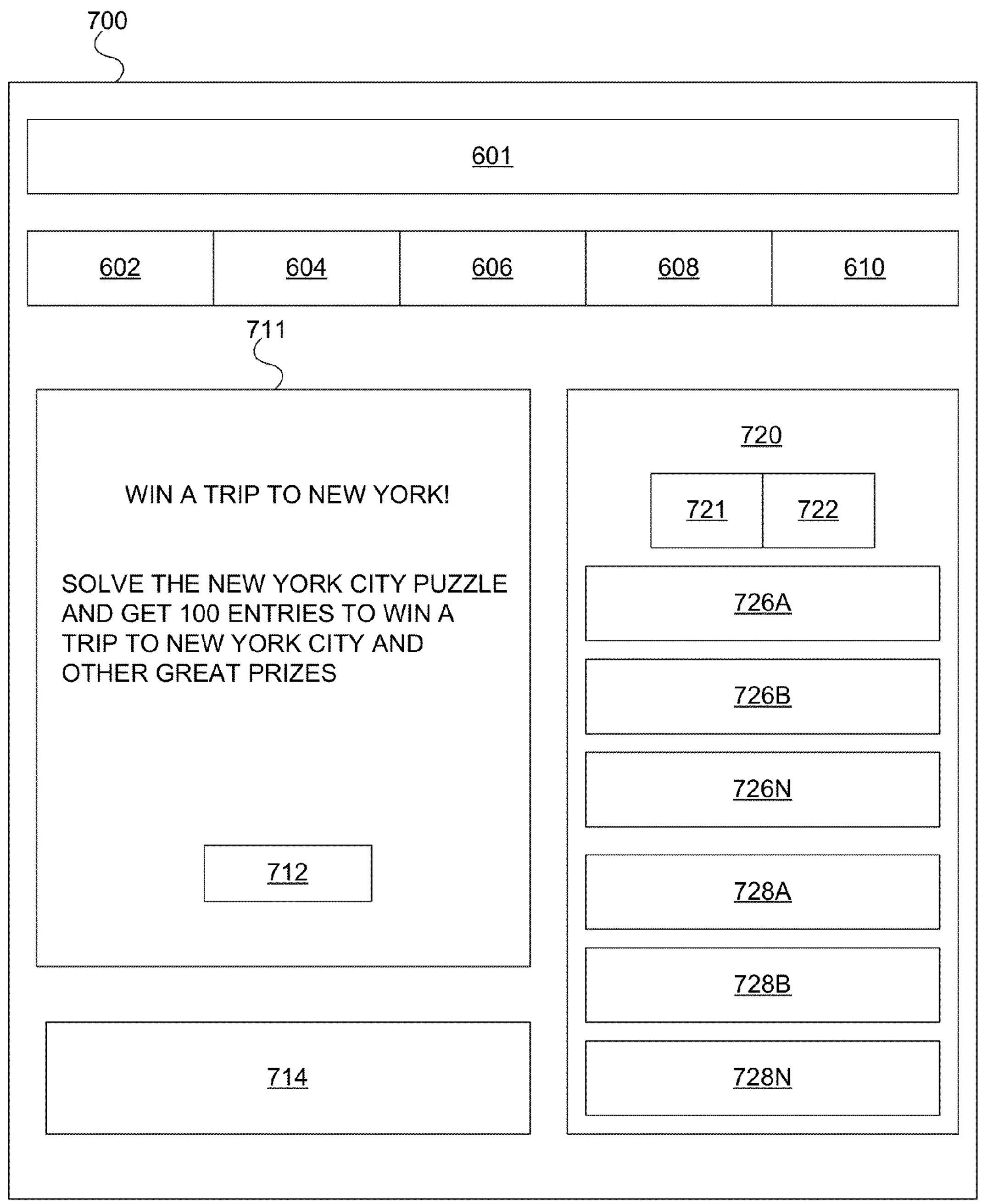
FIG. 7 illustrates a screenshot of a sweepstakes splash interface, according to an aspect of the invention.

FIG. 7 illustrates a screenshot of a sweepstakes splash interface 700, according to an aspect of the invention. Sweepstakes splash interface 700 may include a sweepstakes message display portion 711 that includes content such as video, audio, text, and/or other content that invites the player to solve a puzzle for one or more sweepstakes entries to win sweepstakes prize. Sweepstakes message display portion 711 may include a submit input 712 that causes a sweepstakes puzzle to be displayed for gameplay. Upon solving the sweepstakes puzzle, the player may be awarded the one or more sweepstakes entries. In some embodiments, performance during gameplay may increase and/or decrease the number of sweepstakes entries awarded. For example, the number of sweepstakes entries awarded may depend upon a gameplay metric such as a number of incorrect attempts, a time needed to complete the puzzle, and/or other gameplay metric.

In some embodiments, sweepstakes splash interface 700 may include a chat interface 714 that allows the player to chat with other players before, during, and/or after gameplay. In some embodiments, sweepstakes splash interface 700 may include an invitation display portion 720, which may include various inputs for inviting other players to help solve or play against the player. For example, challenge input 721 may when selected may challenge other player(s) to play the sweepstakes puzzle. Team play input 722 may invite other player(s) to play in collaboration with one another. In some embodiments, when played in collaboration with other players, the sweepstakes entries may be divided amongst the team. When challenging another player, the sweepstakes entries may be awarded to only the winning player(s), which may include adding the losing player(s) possible sweepstakes entries to the sweepstakes entries awarded to winning player(s).

In some embodiments, invite contact portion 726 (illustrated as invite contact portion 726A, 726B, . . . , 726N) may include an input portion that may be used to invite a contact or friend of the player. Invite other player portion 728 (illustrated as invite other player portions 728A, 728B, . . . , 728N) may include an input portion that may be used to invite players other than contacts or friends of the player. For example, the system may select player(s) by various selection methods such as, for example, random selection, selection based on similar player skill levels, and/or other selection method.

Figure 8:
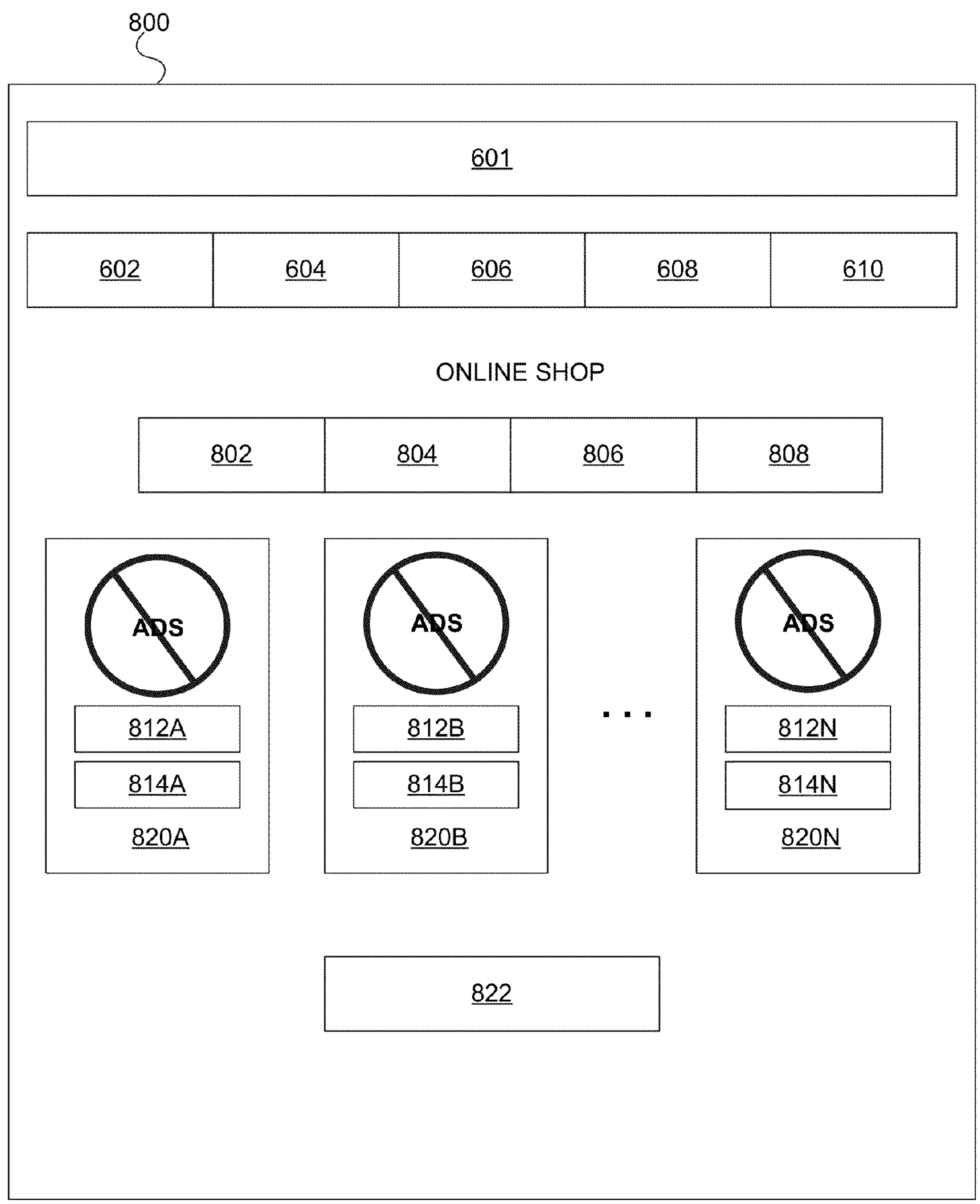
FIG. 8 illustrates a screenshot of an online shop interface, according to an aspect of the invention.

FIG. 8 illustrates a screenshot of an online shop interface 800, according to an aspect of the invention. Online shop interface 800 may offer for sale various items in exchange for real currency, virtual assets, and/or value. The various items for sale may include ad-free play, virtual assets, and/or other items for sale. Selection of online shop components 802 (illustrated as items for sale 802A, 802B, . . . , 802N) may individual link to the different items for sale. In some embodiments, the items for sale may be variably priced. For example, as illustrated, different offers 820 (illustrated as offers 820A, 820B, . . . , 820N) may sell different quantities of ad-free play time in exchange for one or more different costs 812, 814. For example, offer 820A may include 30 days of ad-free play for 1000 diamonds. Offer 820B may include 90 days of ad-free play for a first amount of real currency. Offer 820N may include one year of ad-free play for a second amount of real currency greater than the first amount of currency. Other offers may offer different amounts of ad-free play for a combination of real currency, virtual assets, and/or other value.

Figure 9:
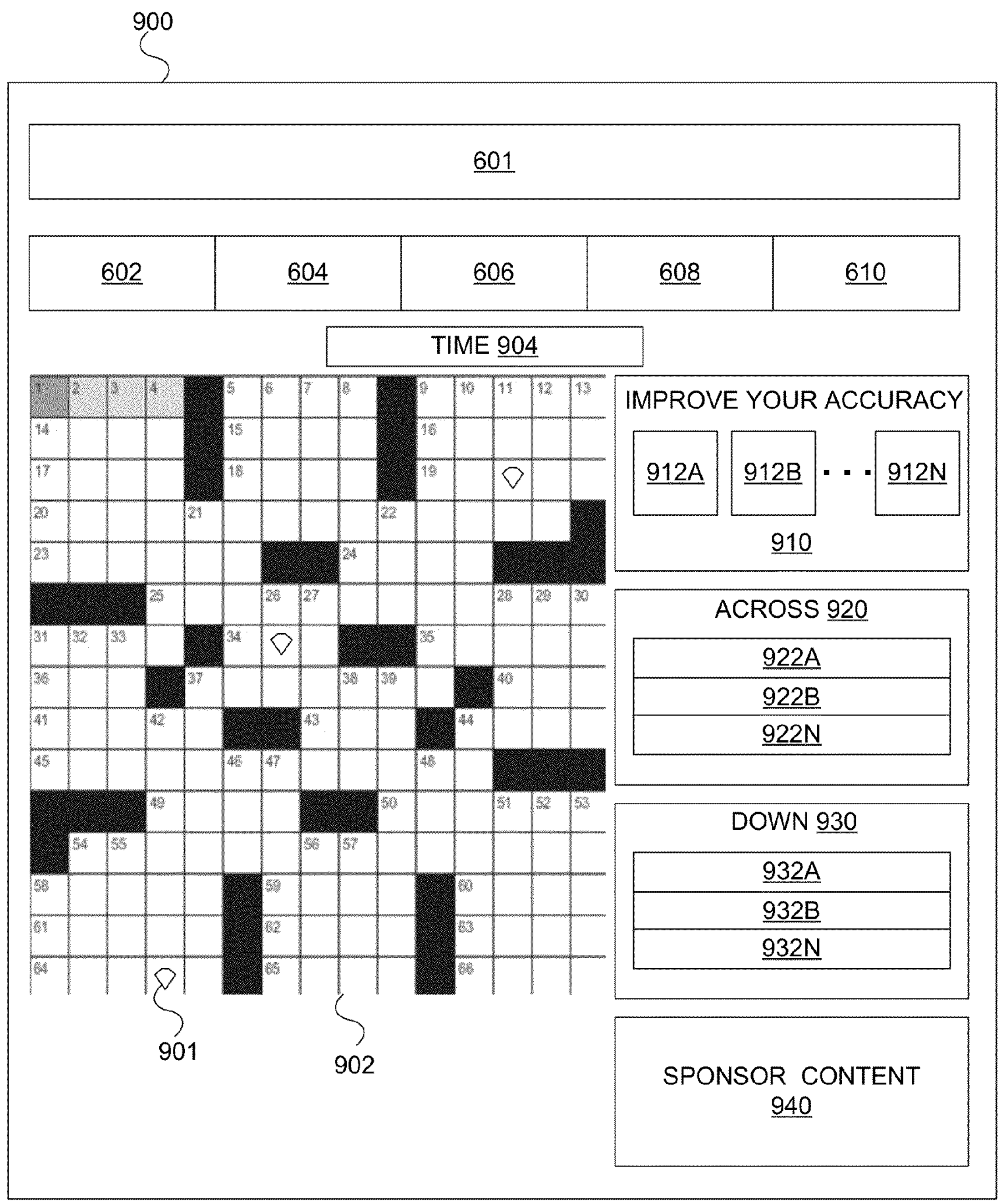
FIG. 9 illustrates a screenshot of a crossword puzzle gameplay interface, according to an aspect of the invention.

FIG. 9 illustrates a screenshot of a crossword puzzle gameplay interface 900, according to an aspect of the invention. In some embodiments, crossword puzzle gameplay interface 900 may display an interface for single or collaborative gameplay. In some embodiments, crossword puzzle gameplay interface 900 may facilitate sponsored word-based games, which may include a sponsored sweepstakes game.

Puzzle board 902 may include various input spaces configured to receive letter inputs in a crossword puzzle format, where at least some spaces of the puzzle board are filler spaces that are not playable (illustrated as darkened boxes). The input spaces may be mapped to a puzzle solution such that letter input at an input space may be checked to determine whether the letter input is correct.

In some embodiments, one or more input spaces may be associated with and be displayed in relation to a bonus icon 901. In some embodiments, when a player inputs a correct letter in an input space associated with bonus icon 901, the player may be awarded a bonus icon award. The bonus icon award may include one or more virtual assets, a sponsored item, a discount off a sponsored item, one or more sweepstakes entries to win a sponsored item, additional time on time remaining for a turn, additional time remaining for a game, and/or other award. The bonus icon 901 may include an image or likeness of the bonus icon award to be won. For example, as illustrated, bonus icon 901 is configured as a diamond, although other images that correspond to the bonus icon award may be used.

In some embodiments, crossword puzzle gameplay interface 900 may include a time component 904. Time component 904 may include a time indicator such as a time remaining for a turn indicator, a time remaining for a game indicator, a time counter that counts an elapsed time for a turn, a time counter that counts an elapsed time for a game, and/or other time indicator.

In some embodiments, crossword puzzle gameplay interface 900 may include a help component 910 that may include one or more help requests 912 (illustrated as help requests 912A, 912B, . . . , 912N). Help requests 912 may elicit help from others such as contacts, from the system in the form of hints, and/or other help requests. Individual help requests 912 may be limited to one or more uses.

In some embodiments, help requests 912 may include an ask a friend request that causes the system to contact another player, contact, and/or other user to help the player solve one or more letters, words, etc. In some embodiments, another player may respond to the help request by logging onto the system, joining the gameplay session in progress and directly enter the letters, words, etc., for which help is requested. In some embodiments, the system facilitates communication between the other user and the player to communicate letters, words, etc., suggested by the other user. The player may reject or otherwise choose not to use some or all of the letters, words, etc., suggested by the other user.

In some embodiments, help requests 912 may include an advertisement-based hint, where the system may display an advertisement in exchange for a reveal hint such as revealing one or more correct letters. The revealed letters may be selected based on various reveal methods such as being randomly revealed, being requested by the user to be revealed, and/or other reveal methods.

In some embodiments, help requests 912 may include a purchased hint, where the system provide a reveal hint in exchange for one or more virtual assets, real currency, and/or other value. In some embodiments, paying a greater quantity of virtual asset, real currency, and/or other value may cause the system to provide a greater reveal hint (e.g., more letters, words, etc., revealed).

In some embodiments, help requests 912 may include a show wrong letter hint where the system may show incorrectly entered letters, words, etc., in exchange for one or more virtual assets, real currency, and/or other value. In some embodiments, paying a greater quantity of virtual asset, real currency, and/or other value may cause the system to provide a greater show wrong letter hint (e.g., more incorrect letters, words, etc., revealed).

In some embodiments, crossword puzzle gameplay interface 900 may include across section 920 and down section 930. Across section 920 may include clues 922 (illustrated as clues 922A, 922B, . . . , 922N) for horizontal words on puzzle board 902. Down section 930 may include clues 932 (illustrated as clues 932A, 932B, . . . , 932N) for vertical words on puzzle board 902.

In some embodiments, crossword puzzle gameplay interface 900 may include sponsored content 940, which may include promotional materials such as advertisements, coupons, and/or other promotional materials. Sponsored content 940 may correspond with puzzle board 902. For example, in a sponsored game that includes entries for sweepstakes to win a sponsored prize, sponsored content may include an advertisement for the sponsored prize. In some embodiments, puzzle board 902 may incorporate one or more words related to the sponsor and/or the sponsored prize that may be won.

Although illustrated as a conventional crossword puzzle, puzzle board 902 and other puzzle boards illustrated in other figures may be configured to have other appearances such as, for example, having differently shaped input spaces, and/or other changes to the appearance of the puzzle board.

Figure 10:
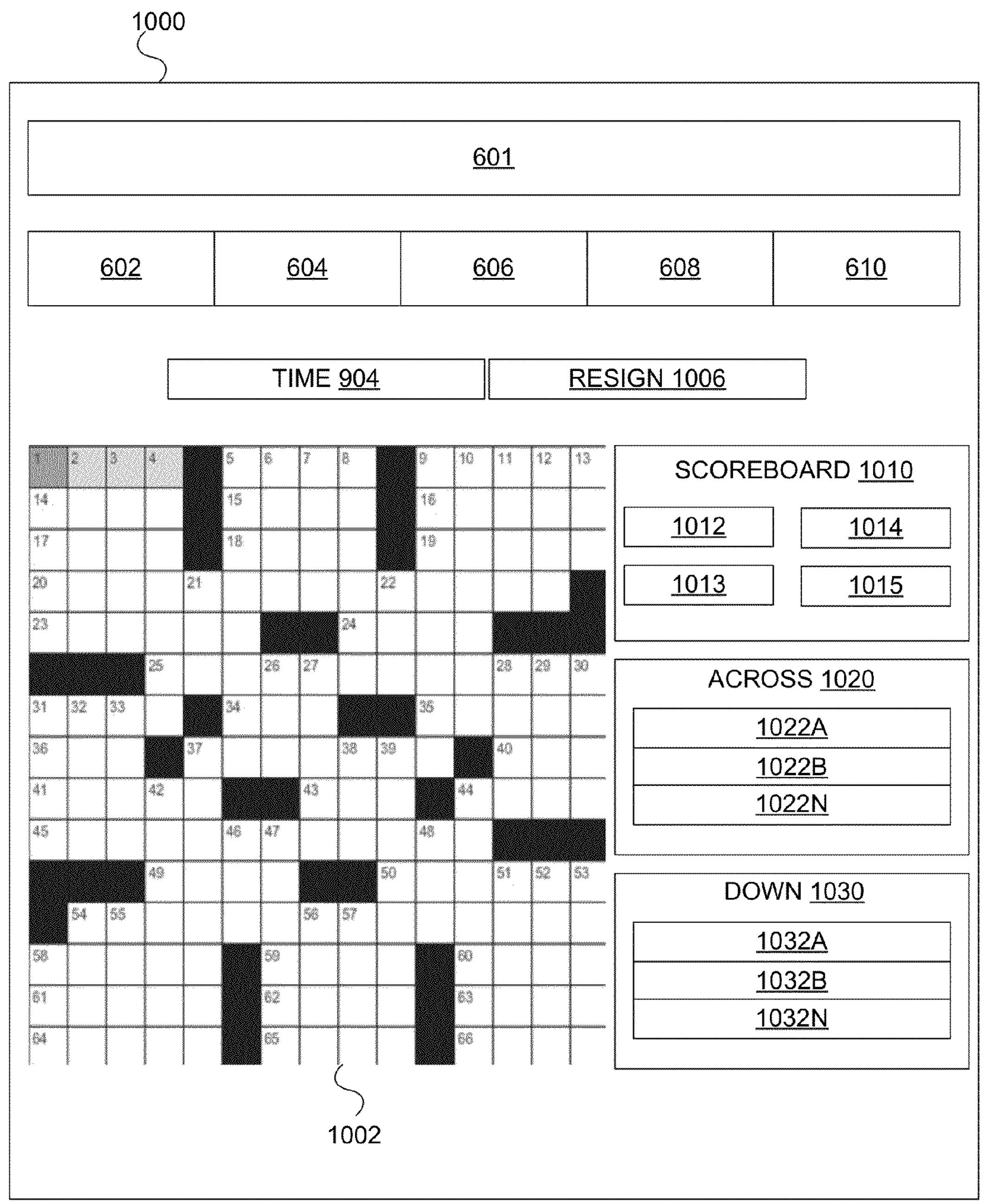
FIG. 10 illustrates a screenshot of a head-to-head crossword puzzle gameplay interface, according to an aspect of the invention.

FIG. 10 illustrates a screenshot of a head-to-head crossword puzzle gameplay interface 1000, according to an aspect of the invention. Head-to-head crossword puzzle gameplay interface 1000 may substantially include similar components as crossword puzzle gameplay interface 900. Head-to-head crossword puzzle gameplay interface 1000 may include a resign component 1006, which may be used by a player to resign the game and/or turn. Puzzle board 1002 may be used to receive letter inputs from one or more competing players in a turn-based architecture, a simultaneous play architecture (where two or more players on the same or different teams may simultaneously input letters), and/or other architecture. Scoreboard 1010 may include a scoreboard for two or more players/teams of players 1012-1015.

Figure 11:
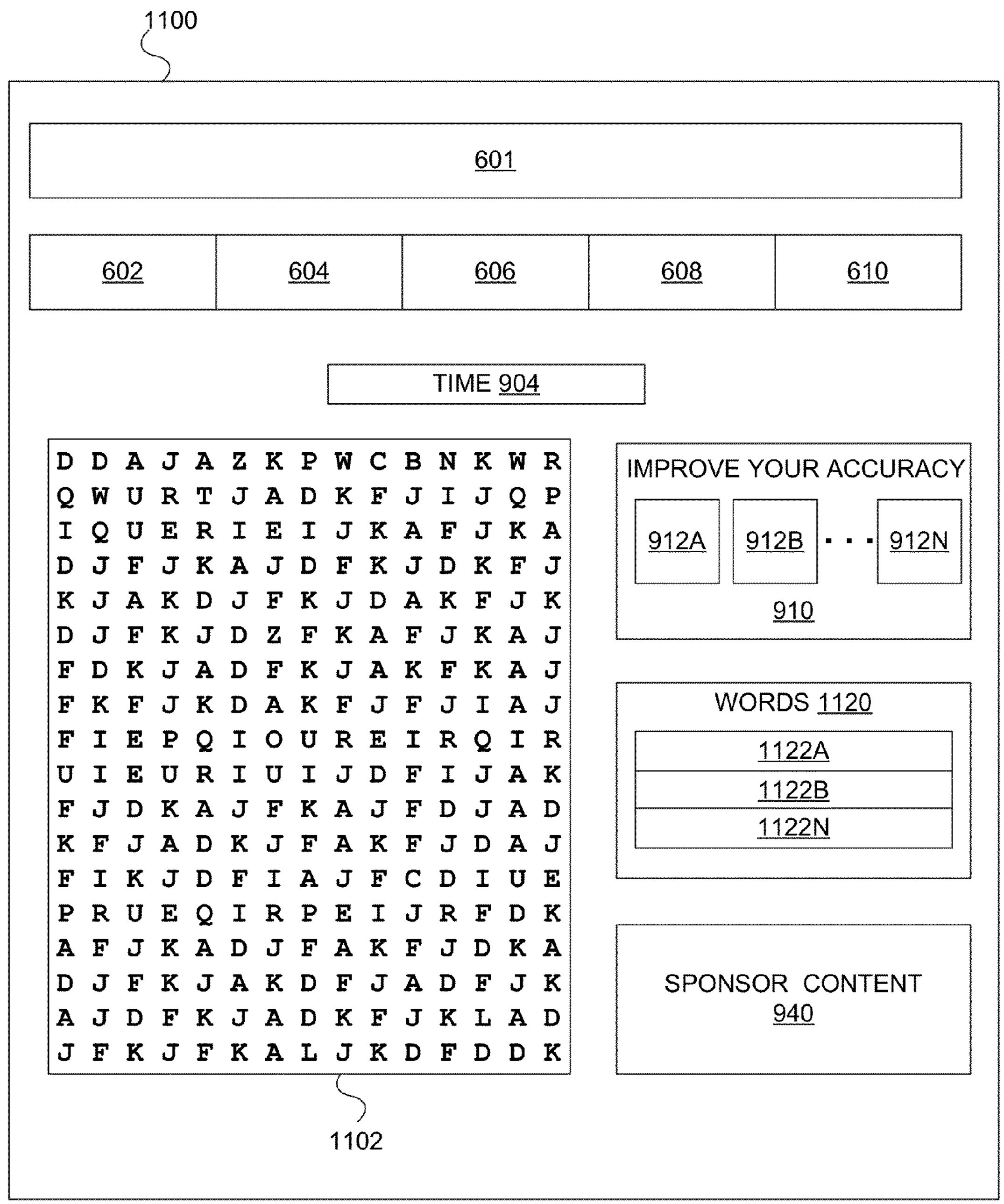
FIG. 11 illustrates a screenshot of a words search puzzle gameplay interface, according to an aspect of the invention.

FIG. 11 illustrates a screenshot of a word search puzzle gameplay interface 1100, according to an aspect of the invention. Word search puzzle gameplay interface 1100 may include features similar to crossword puzzle gameplay interface 900 and head-to-head crossword puzzle gameplay interface 1000, but configured to facilitate gameplay of a word search puzzle board 1102. In some embodiments, words section 1120 may include clues 1122 (illustrated as clues 1122A, 1122B, . . . , 1122N). Clues 1122 may include actual words to be found in puzzle board 1102 and/or hints to actual words to be found in puzzle board 1102.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for providing gameplay of branded word-based puzzles comprising crossword puzzles or word search puzzles, the system comprising:

one or more processors configured to execute one or more computer program modules, the one or more computer program modules comprising:

a gameplay module configured to:

generate a custom puzzle having a predefined solution that includes one or more words to be solved or found, wherein the one or more words to be solved or found are related to a particular brand of a sponsor of the custom puzzle;

cause the custom puzzle to be communicated for gameplay;

receive an input of at least one letter associated with an attempt to solve the custom puzzle;

compare the input with the predefined solution;

determine that the custom puzzle has been at least partially solved based on the comparison;

cause a branded item or one or more sweepstakes entries to win the branded item to be provided based on the determination that the custom puzzle has been at least partially solved; and an accounting module configured to:

facilitate receipt of sponsored funds from the sponsor of the custom puzzle based on the custom puzzle being communicated for gameplay.

2. The system of claim 1, wherein at least one input space of the custom puzzle is associated with an icon of a virtual asset or the branded item, wherein the gameplay module is configured to cause the virtual asset or one or more sweepstakes entries to be awarded and the at least one input space when input with a correct letter causes the virtual asset, the branded item, or additional sweepstakes entries to be provided.

3. The system of claim 1, wherein the branded item comprises a branded product, a branded service, or a branded product and a branded service.

4. The system of claim 1, wherein the gameplay module is further configured to cause the one or more sweepstakes entries to be provided, and wherein the accounting module is configured to receive one or more first type of virtual assets in exchange for one or more other sweepstakes entries.

5. The system of claim 4, wherein the one or more first type of virtual assets is one among a plurality of different types of virtual assets that may be used in relation to the custom puzzle, wherein only the first type of virtual assets may be used to obtain the one or more other sweepstakes entries.

6. The system of claim 1, further comprising:

a communication module configured to facilitate in-game communication between different users.

7. The system of claim 1, wherein the gameplay module is further configured to:

impose a time limit within which the custom puzzle must be completely solved for the branded item or the one or more sweepstakes entries to win the branded item to be provided.

8. The system of claim 1, further comprising:

a custom puzzle module configured to:

obtain a game definition that specifies the one or more words, wherein the custom puzzle is generated by the gameplay module based on the game definition.

9. The system of claim 8, wherein the game definition further comprises an indication of an orientation of the one or more words on the custom puzzle, and wherein the gameplay module is further configured to:

arrange the one or more words on the custom puzzle based on the indication of the orientation of the one or more words.

10. The system of claim 9, wherein the custom puzzle comprises a custom crossword puzzle, and wherein the orientation of the one or more words comprises a horizontal orientation or a vertical orientation.

11. The system of claim 9, wherein the custom puzzle comprises a custom word search puzzle, and wherein the orientation of the one or more words comprises at least one of a horizontal orientation, a vertical orientation, a backward orientation, a forward orientation, or an angled orientation.

12. The system of claim 8, wherein the game definition further comprises an indication of a location of the one or more words on the custom puzzle, and wherein the gameplay module is further configured to:

position the one or more words on the custom puzzle based on the indication of the location of the one or more words.

13. The system of claim 8, wherein the game definition further comprises a clue for the one or more words on the custom puzzle, and wherein the gameplay module is further configured to:

provide the clue along with the custom puzzle.

14. The system of claim 8, wherein the game definition further comprises an indication of a level of difficulty of the custom puzzle, and wherein the gameplay module is further configured to:

determine a level of skill for a player of the custom puzzle based on the level of difficulty of the custom puzzle.

15. The system of claim 8, wherein the custom puzzle module is configured to obtain the game definition from the sponsor.

16. The system of claim 1, wherein the custom puzzle comprises a custom crossword puzzle.

17. The system of claim 1, wherein the custom puzzle comprises a custom word search puzzle.

18. A method for providing gameplay of word-based puzzles comprising crossword puzzles or word search puzzles, the method being implemented in a computer that includes one or more processors programmed by one or more computer program modules, the method comprising:

generating, by a gameplay module, a custom puzzle having a predefined solution that includes one or more words to be solved or found, the one or more words to be solved or found being related to a particular brand of a sponsor of the custom puzzle;

causing, by the gameplay module, the custom puzzle to be communicated for gameplay;

receiving, by the gameplay module, an input of at least one letter associated with an attempt to solve the custom puzzle;

comparing, by the gameplay module, the input with the predefined solution;

determining, by the gameplay module, that the custom word-based game has been at least partially solved based on the comparison;

causing, by the gameplay module, a virtual asset, a branded item, or one or more sweepstakes entries to win the virtual asset or the branded item to be provided based on the determination that the custom puzzle has been at least partially solved; and facilitating, by an accounting module, receipt of sponsored funds from the sponsor of the custom puzzle based on the custom puzzle being communicated for gameplay.

19. The method of claim 18, wherein at least one input space of the custom puzzle is associated with an icon of the virtual asset or the branded item, wherein the gameplay module is configured to cause the virtual asset, the branded item, or the one or more sweepstakes entries to be provided and the at least one input space when input with a correct letter causes the virtual asset, the branded item, or additional sweepstakes entries to be provided.

20. The method of claim 18, wherein the branded item comprises a branded product, a branded service, or a branded product and a branded service.

21. The method of claim 18, the method further comprising:

causing, by the gameplay module, the one or more sweepstakes entries to be provided, and wherein the accounting module is configured to receive one or more first type of virtual assets in exchange for one or more other sweepstakes entries.

22. The method of claim 21, wherein the one or more first type of virtual assets is one among a plurality of different types of virtual assets that may be used in relation to the custom puzzle, wherein only the first type of virtual assets may be used to obtain the one or more other sweepstakes entries.

23. The method of claim 18, the method further comprising:

facilitating, by a communication module, in-game communication between different users.

24. The method of claim 18, the method further comprising:

imposing, by the gameplay module, a time limit within which the custom puzzle must be completely solved for the branded item or the one or more sweepstakes entries to win the branded item to be awarded.

25. A system for providing gameplay of branded word-based puzzles comprising crossword puzzles or word search puzzles, the system comprising:

one or more processors configured to execute one or more computer program modules, the one or more computer program modules comprising:

a custom puzzle module configured to:

obtain a custom puzzle that includes one or more words to be solved or found that are related to a particular brand of a sponsor of the custom puzzle;

a gameplay module configured to:

generate the custom puzzle;

cause the custom puzzle to be communicated for gameplay;

determine that the custom puzzle has been at least partially solved;

cause a branded item or one or more sweepstakes entries to win the branded item to be provided based on the determination that the custom puzzle has been at least partially solved, wherein at least one input space of the custom puzzle is associated with an icon of a virtual asset or the branded item, wherein the gameplay module is configured to cause the virtual asset or one or more sweepstakes entries to be provided and the at least one input space when input with a correct letter causes the virtual asset, the branded item, or additional sweepstakes entries to be provided; and an accounting module configured to:

facilitate receipt of sponsored funds from the sponsor of the custom puzzle based on the custom puzzle being communicated for gameplay.

26. The system of claim 25, further comprising:

a custom puzzle module configured to:

obtain a game definition that specifies the one or more words, wherein the custom puzzle is generated by the gameplay module based on the game definition.

27. The system of claim 25, further comprising:

a custom puzzle module configured to:

obtain at least some of the one or more words from the sponsor.

28. A method for providing gameplay of branded word-based puzzles comprising crossword puzzles or word search puzzles, the method being implemented in a computer that includes one or more processors programmed by one or more computer program modules, the method comprising:

obtaining, by a custom puzzle module, a custom puzzle that includes one or more words to be solved or found that are related to a particular brand of a sponsor of the custom puzzle;

generating, by a gameplay module, the custom puzzle;

causing, by the gameplay module, the custom puzzle to be communicated for gameplay;

determining, by the gameplay module, that the custom puzzle has been at least partially solved;

causing, by the gameplay module, a branded item or one or more sweepstakes entries to win the branded item to be provided based on the determination that the custom puzzle has been at least partially solved, wherein at least one input space of the custom puzzle is associated with an icon of a virtual asset or the branded item, wherein the gameplay module is configured to cause the virtual asset or one or more sweepstakes entries to be provided and the at least one input space when input with a correct letter causes the virtual asset, the branded item, or additional sweepstakes entries to be provided; and facilitating, by an accounting module, receipt of sponsored funds from the sponsor of the custom puzzle based on the custom puzzle being communicated for gameplay.

29. The method of claim 28, the method further comprising:

obtaining, by a custom puzzle module, a game definition that specifies the one or more words, wherein the custom puzzle is generated by the gameplay module based on the game definition.

30. The method of claim 28, the method further comprising:

obtaining, by the custom puzzle module, at least some of the one or more words from the sponsor.

* * * * *